(12) United States Patent
McCafferty

(10) Patent No.: US 10,191,261 B2
(45) Date of Patent: Jan. 29, 2019

(54) MACRO LENS

(71) Applicant: TANTUM OPTICS, LLC, Tucson, AZ (US)

(72) Inventor: Sean J. McCafferty, Tucson, AZ (US)

(73) Assignee: TANTUM OPTICS, LLC, Tucson, AZ (US)

( * ) Notice: Subject to any disclaimer, the term of this patent is extended or adjusted under 35 U.S.C. 154(b) by 0 days.

(21) Appl. No.: 15/501,406

(22) PCT Filed: Aug. 6, 2015

(86) PCT No.: PCT/US2015/043965
§ 371 (c)(1),
(2) Date: Feb. 2, 2017

(87) PCT Pub. No.: WO2016/022771
PCT Pub. Date: Feb. 11, 2016

(65) Prior Publication Data
US 2017/0235113 A1    Aug. 17, 2017

Related U.S. Application Data

(63) Continuation of application No. PCT/US2014/050318, filed on Aug. 8, 2014.
(Continued)

(51) Int. Cl.
*G02B 15/22* (2006.01)
*G02B 3/14* (2006.01)
(Continued)

(52) U.S. Cl.
CPC ............. *G02B 15/22* (2013.01); *G02B 3/14* (2013.01); *G02B 7/105* (2013.01); *G02B 13/18* (2013.01)

(58) Field of Classification Search
CPC .............. G02B 3/12–3/14; G02B 15/14–15/28
(Continued)

(56) References Cited

U.S. PATENT DOCUMENTS

| 4,255,020 A |   | 3/1981 | Yukio |
| 4,514,048 A | * | 4/1985 | Rogers ................ G02B 3/14 351/159.41 |

(Continued)

FOREIGN PATENT DOCUMENTS

EP  2296019 A1  3/2011

OTHER PUBLICATIONS

International Search Report and Written Opinion in related International Application No. PCT/US2015/043965, dated Nov. 24, 2015, 8 pages.
(Continued)

*Primary Examiner* — Zachary Wilkes
(74) *Attorney, Agent, or Firm* — Yakov S. Sidorin; Quarles & Brady LLP

(57) ABSTRACT

Accommodating (re-focusable) macro lens system which includes first and second individual lenses having first and second optical portions sequentially disposed along an optical axis. Change in optical-power of macro lens results from by changing the flattened area of contact between the lenses in response to force applied to the lenses axially by an external compressor operably connected with or forming a part of macro lens housing. Method for operating same.

29 Claims, 17 Drawing Sheets

Related U.S. Application Data

(60) Provisional application No. 62/076,303, filed on Nov. 6, 2014, provisional application No. 62/093,909, filed on Dec. 18, 2014.

(51) Int. Cl.
 *G02B 7/105* (2006.01)
 *G02B 13/18* (2006.01)

(58) Field of Classification Search
 USPC .................................. 359/665–667, 676–693
 See application file for complete search history.

(56) References Cited

U.S. PATENT DOCUMENTS

| | | | | |
|---|---|---|---|---|
| 5,073,017 A * | 12/1991 | Suda | .................... | G02B 27/646 |
| | | | | 359/557 |
| 6,081,388 A | 6/2000 | Widl | | |
| 7,031,071 B2 | 4/2006 | Nishioka | | |
| 7,855,838 B2 * | 12/2010 | Jannard | .................... | G02B 3/14 |
| | | | | 359/665 |
| 8,724,198 B2 * | 5/2014 | Spatscheck | .............. | G02B 3/00 |
| | | | | 359/196.1 |
| 9,116,295 B2 * | 8/2015 | Cheng | ....................... | G02B 3/14 |
| 2008/0144185 A1 | 6/2008 | Wang et al. | | |
| 2010/0231783 A1 | 9/2010 | Bueler et al. | | |
| 2011/0235186 A1 | 9/2011 | Blum et al. | | |
| 2012/0307384 A1 | 12/2012 | Cheng | | |
| 2012/0320257 A1 | 12/2012 | Shabtay et al. | | |

OTHER PUBLICATIONS

Extended European Search Report issued in related European patent application 15829549.3, dated Mar. 15, 2018, 8 pages.

\* cited by examiner

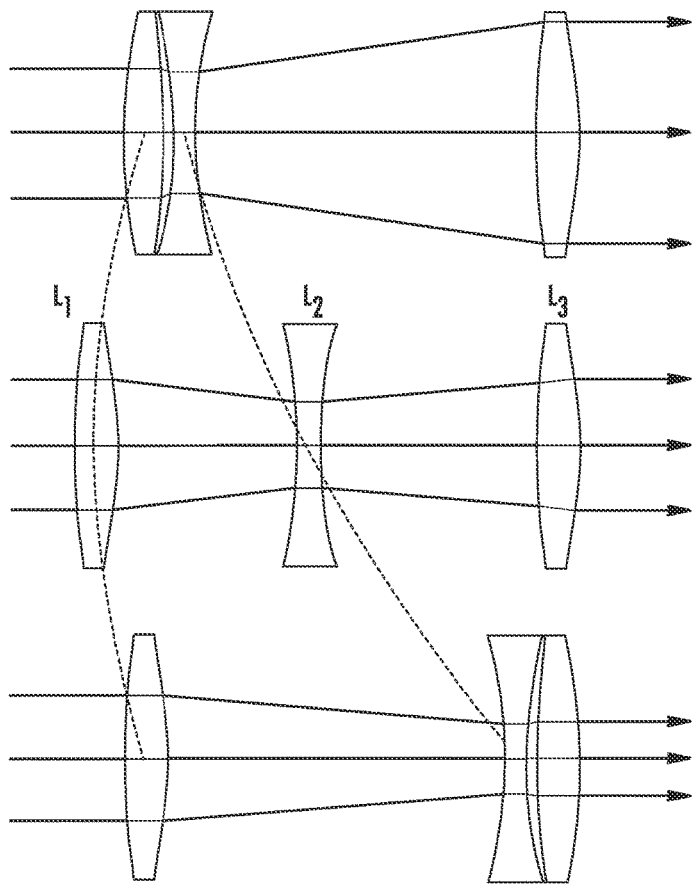
FIG. 1A
(PRIOR ART)
FIG. 1B
(PRIOR ART)
FIG. 1C
(PRIOR ART)
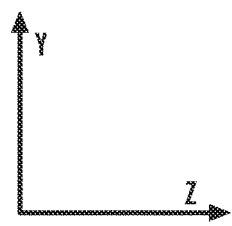

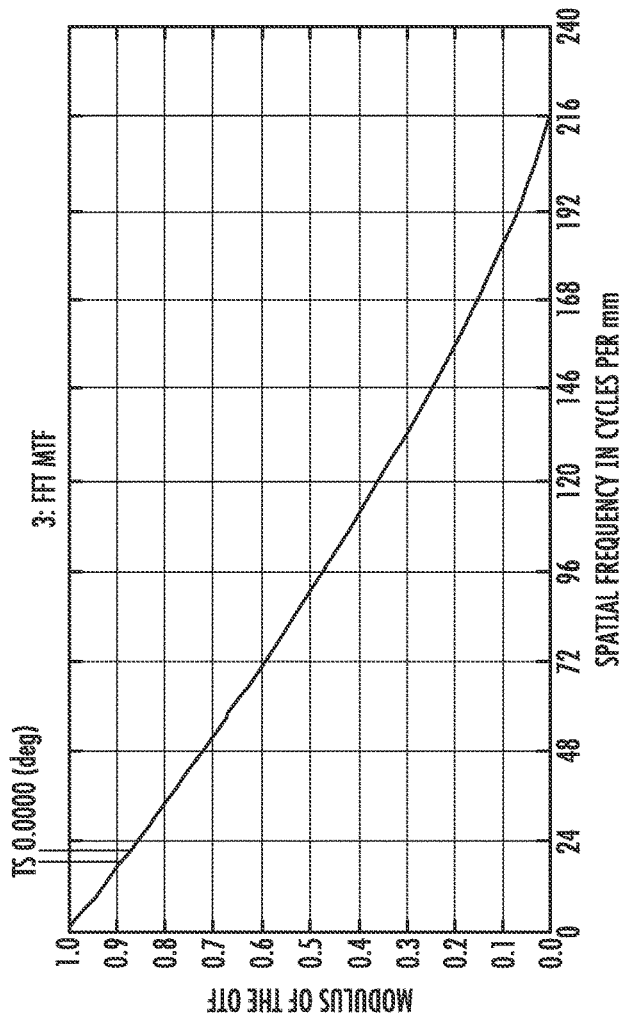
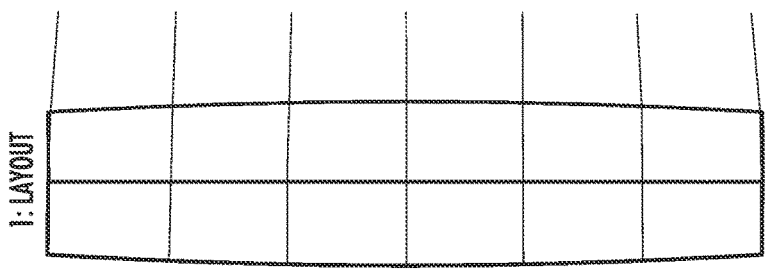
FIG. 4F

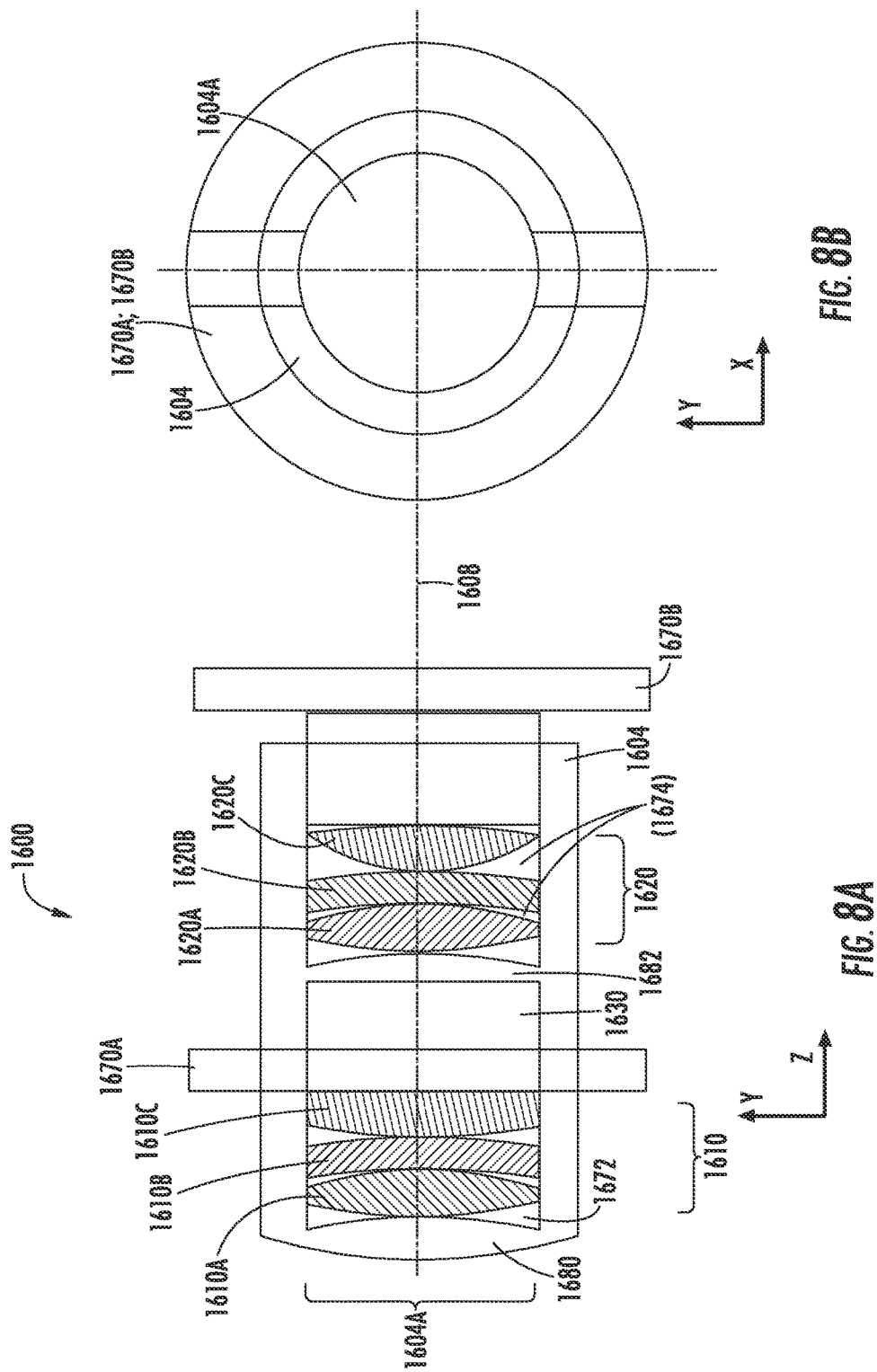

MACRO LENS

CROSS-REFERENCE TO RELATED APPLICATION

The present application represents the national stage entry of the International Application PCT/US2015/043965, filed on Aug. 6, 2016, which claims priority from the international patent application No. PCT/US2014/050318 filed on Aug. 8, 2014, and which also claims priority from the U.S. provisional patent applications Nos. 62/076,303 filed on Nov. 6, 2014 and 62/093,909 filed on Dec. 18, 2014.

The disclosure of each of the above-mentioned patent documents is incorporated herein by reference in its entirety.

TECHNICAL FIELD

The present invention relates to zoom lens systems and, in particular, to a multi-lens macro lens system that is configured to have its effective focal length continuously changed as a result of flattening of an axial portion of the surface of a constituent lens of the system, which axial portion in a specific case can be shaped as a prolate aspheric.

BRIEF DESCRIPTION OF THE DRAWINGS

The invention will be more fully understood by referring to the following Detailed Description in conjunction with the generally not-to-scale Drawings, of which:

FIGS. 1A, 1B, 1C provide a schematic illustration to a conventional zoom macro lens;

FIGS. 4A, 4B, 4C, 4D, 4E, and 4F summarize data representing changes in operational characteristics of an embodiment of the invention as a function of a degree of flattening of contacting each other surfaces of constituent lenses of the embodiment;

FIGS. 8A and 8B are diagrams illustrating, in side and front views, a related embodiment of a variable-focus lens system including an anterior sub-system of lenses and a posterior subsystem of lenses (separated from one another by a gap), the focal lengths of which are individually adjustable according to the embodiment of the invention;

SUMMARY

Figure 2A:
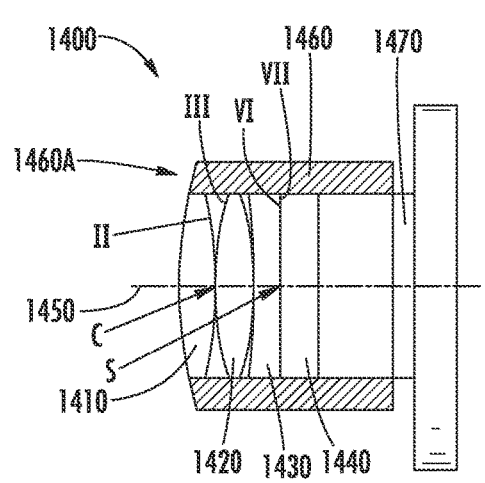
FIGS. 2A and 2B are diagrams illustrating in side and front views an embodiment of a variable-focus lens system when no applanation is caused by mutually-facing internal surfaces of the system.

Embodiments provide a variable-focal-length macro lens system that includes (i) a first lenslet having a first optical power and a first rotationally-symmetric optical portion defining a clear aperture of the first lenslet, and (ii) a second lenslet having a second optical power and a second rotationally-symmetric optical portion defining a clear aperture of the second lenslet, such that the first and second lenslets are disposed co-axially to define a contact between surfaces thereof at an axial point. The system additionally includes means for transfer of motion applied to a surface of at least one of the first and second lenslets to a force applanating at least one of said surfaces about the axial point such that an area of applanation of the surface in question depends on a degree of such motion. The system may be equipped with a housing unit enclosing the first and second lenslets and mechanically cooperated with the means of transfer of motion which, in a specific case, may include a piston movable internally with respect to the housing. In one embodiment, the lens system is configured to have a first surface of the first lenslet and a second surface of the second lenslet interact with one another, in response to a non-zero force transferred to at least one of the first and second surfaces by said means, such as to mutually applanate one another to define respective applanated areas diameters of which progressively increase with increase in such non-zero force created by means for transfer of motion. In a specific case, a process of increase in a diameter of an applanated area of any of the first and second surfaces response to increase of such force, optical aberrations of the lens system that are caused by changes in the diameter of the applanated area are minimized In a specific case, the macro lens of the invention additionally includes a third lens disposed coaxially with the first and second lenses and separated from the first lens by the second lens, the third lens having a prolate aspheric surface centered on the optical axis. Such specific implementation of the macro lens contains two groups of lenses, where first and second groups of lenses are separated from each other by a gap. The first group includes the first and second lenses, the second group includes the third lens (and optionally additional lenses such as the fourth lens, the fifth lens, and so on). Such specific macro lens is equipped with a second repositionable element in operable cooperation with the second group of lenses. The second repositionable element is configured to change a curvature of a surface of the third lens in response to a motion of the second repositionable element. In such specific implementation of the macro lens, the macro lens may be dimensioned to make a focal point of the first group of lenses and a focal point of the second group of lenses coincide while maintaining the back focal distance of the macro lens substantially constant throughout the range of change of optical power of the macro lens. The first groups of lenses may have a positive optical power while the second group of lenses has a negative optical power. Alternatively, each of the first and second groups of lenses may have a corresponding positive optical power (while, optionally, the second group of lenses is submerged in a fluid a refractive index of which is higher than a refractive index of the third lens).

Embodiments of the invention additionally provide (i) an optical camera comprising a macro lens system as stated above and an optical detector in optical communication with the first group of lenses and separated from the first group of lenses by the second group of lenses and (ii) a method for operating of the macro lens.

DETAILED DESCRIPTION

Needs for a variable-focus lens system are numerous and range from uses in optical engineering (such as, for example, in an imaging system used for the purposes of the quality control) to photography.

To this end, references throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended or even capable to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The invention as recited in claims appended to this disclosure is intended to be assessed in light of the disclosure as a whole.

The terms macro lens and macro lens system as used herein refer to a lens system configured and suitable for use in opto-mechanical instruments such as an optical camera or telescope, for example, and, in particular, for taking photographs. The macro lens system is distinguished and differentiated, for the purposes of this disclosure, from a micro lens (referring herein to a small lens system, generally with a lens diameter of just a few millimeters (for example, 2 or 3 millimeters) and often less than a millimeter, such as an intraocular lens or optics known as a wafer-level optics or a lenticular lens, for example) not only in dimensions and structure, but also by the fact that an application of an embodiment of the invention requires a macro-sized supporting structure that is external to the constituent component of a macro lens systems and that houses such components while keeping them in optical communication with one another. It is recognized in the art that operational and material requirements and/or fabrication processes specific to micro lenses do not allow for reusing or adaptation of micro-lens structural design and/or features in devising a macro lens with reasonable expectation of success. In fact, a skilled artisan does not expect to build a macro lens system according to principles of a given micro lens system (by, for example, proportionally changing dimensions of the system). The configurational features of a macro lens system according to embodiments of the invention are chosen exclude from a constituent lens of a system those structural features that are specific to a micro lens (such as, for example, a haptic portion often used in an IOL structure, or a relief surface of a lenticular lens).

Zoom lenses afford the user the convenience of variable focal length at the cost of complexity, and achieve this convenience through compromises on image quality, weight, dimensions, aperture, both speed and accuracy of autofocus performance, quality and cost of manufacture. For example, all zoom lenses suffer from at least slight, if not considerable, loss of image resolution at their maximum aperture, especially at the extremes of their focal length range. This effect is evident in the corners of the image, when displayed in a large format or high resolution. The greater the range of focal length a zoom lens offers, the more exaggerated these compromises must become.

There are many possible designs for zoom lenses, the most complex ones having upwards of thirty individual lens elements and multiple moving parts. Most, however, follow the same basic design. Generally they include a number of individual, constituent lenses that may be either fixed (in which their positions along the optical axis remain the same) or slide axially along the body of the lens. While the magnification of a zoom lens changes, any movement of the focal plane is compensated for to keep the focused image sharp. Such compensation may be done by mechanical means (moving the complete lens assembly while the magnification of the lens changes) or optically (arranging the position of the focal plane to vary as little as possible while the lens is zoomed).

A known simple scheme for a zoom lens (such as that of FIGS. 1A, 1B, 1C) includes a focusing lens similar to a standard, fixed-focal-length photographic lens, preceded by an afocal zoom system, formed by fixed and movable lens elements. The afocal zoom system is structured not to focus the light, but to alter the size of a beam of light travelling through it, and thus the overall magnification of the lens system. The example of FIGS. 1A, 1B, 1C shows an afocal system formed by two positive lenses $L_1$ and $L_3$, with a negative lens $L_2$ between them. Lens $L_3$ is fixed, but lenses $L_1$ and $L_2$ can be moved axially in a particular non-linear relationship. While the negative lens $L_2$ is moved from the front to the back of the lens, the lens $L_1$ is moved forward and then backward in a parabolic arc. By doing so, the overall angular magnification of the system is varied, changing the effective focal length of the complete zoom lens. At each of the three instances shown in FIGS. 1A, 1B, 1C, the three-lens system is afocal (neither diverging or converging the light), and hence does not alter the position of the focal plane of the lens. While between the points corresponding to FIGS. 1A, 1B, 1C the system is not exactly afocal, the variation in focal plane position can be kept small enough (on the order of 0.01 mm) to not make a significant change to the sharpness of the image.

According to an embodiment of the invention, the problem of changing an effective focal length of a macro lens is solved by structuring the macro lens as a coaxial assembly of at least two individual constituent lenses operably cooperated with an external mechanism (configured as part of the macro-lens housing arrangement) such as to form and apply force to the assembly to vary an area of contact between two facing each other surfaces of constituent lenses and to reversibly reduce a curvature of at least one of such facing each other surfaces within the area of contact. The individual lenses of a macro lens are configured to have at least one flexible prolate aspherical surface the curvature of which can be varied (at least in an area around the optical axis) in response to the externally-applied force.

According to a related embodiment of the invention, the problem of varying the focal length of a multi-element macro lens is solved by providing a co-axially queued (arrayed) individual constituent lenses, at least two of which are in contact at a point located at the axis of the macro lens, and utilizing a means for axially compressing at least a portion of this array of lenses such that at least one surface of the lenses that are in contact at the axial point is deformed in response to the axially-applied pressure (and, optionally, in response to minute axial movement of a component of the system) to increase a radius of curvature of such surface in an area about the axis, Numbering of structural surfaces. In describing the order of elements or components in an embodiment of a lens system of the invention or a sub-set of such system, the following convention will be generally followed herein, unless stated otherwise. The order in which the surfaces of sequentially positioned structural elements of the lens assembly are viewed along a direction of light incident on the lens system, in operation and/or when installed, from the object is the ascending order in which these surfaces are referred to as the first surface (or surface 1, surface I), the second surface (or surface 2, surface II), the third surface (or surface 3, surface III), the fourth surface (or surface 4, surface IV) and other surfaces if present. For example, in the case of FIGS. 1A, 1B, 1C the direction of incidence of light is indicated as the z-axis. Generally, therefore, surfaces of the structural elements (such as individual optical elements) of an embodiment of the invention are numerically labeled starting with a surface that corresponds to the front portion of the lens system and that is proximal to the object and ending with a surface that corresponds to the back portion of an assembly and that is proximal to an image plane. Accordingly, the term "behind" refers to a position, in space, following a position of something else and suggests that one element or thing is at the back of another as viewed from the front of the lens assembly. Similarly, the term "in front of" refers to a forward place or position, with respect to a particular element as viewed from the front of the assembly. As would be understood by a person of skill in the art, the lens is configured such as to receive light (incident onto from the ambient medium) through surface I; when the order of surfaces and/or parameters of individual elements is changed as compared to a particular configuration, the change in optical characteristics and operation of the macro lens may be drastic and unpredictable, and requires separate consideration. In other words, arbitrary change in orientation of a given macro lens or its constituent elements with respect to incident light does not provide equivalent or similar results with respect to imaging an object as those for which such given macro lens has been configured.

For the purposes of this disclosure and the appended claims, the use of the term "substantially" as applied to a specified characteristic or quality descriptor means "mostly", "mainly", "largely but not necessarily wholly the same" such as to reasonably denote language of approximation and describe the specified characteristic or descriptor so that its scope would be understood by a person of ordinary skill in the art. The use of this term neither implies nor provides any basis for indefiniteness and for adding a numerical limitation to the specified characteristic or descriptor. For example, a reference to a vector or line being substantially parallel to a reference line or plane is to be construed as such vector or line extending along a direction that is the same as or very close to that of the reference line or plane (for example, with angular deviations from the reference direction that are considered to be practically typical in the art). As another example, the use of the term "substantially flat" in reference to the specified surface implies that such surface may possess a degree of non-flatness and/or roughness that is sized and expressed as commonly understood by a skilled artisan in the specific situation at hand. As known in the art, the term "spherical surface" generally refers to a surface that forms a part of a surface of a sphere, while the term aspherical surface or a similar term generally refers to a surface that spatially deviates from the spherical surface within identified bounds.

EXAMPLE I

General Considerations

FIGS. 2A, 2B, 3A, and 3B are schematic illustrations, in side and front views, of an embodiment 1400 of a variable-focus macro lens system structured and operable according to the idea of the invention. Generally, the macro lens of the invention includes a train (array) of multiple individual lenses (shown as lenses 1410, 1420, 1430, 1440) disposed sequentially and co-axially about the optical axis (shown as 1450) within the housing, 1460, that has an outer shell defining a hollow volume therein. The front surface of lens 1410 (surface I, not marked) corresponds to the front of the macro lens. The individual lenses 1410, 1420, 1430, and 1440 are disposed in the hollow. Generally, the housing 1460 is equipped with an appropriate stopper element (not shown) at the front portion 1460A to keep the lenses within the hollow of the housing. As shown, each two immediately adjacent lenses are abutting one another at a corresponding axial point such that the mutually-facing surfaces of these two immediately adjacent lenses are in contact with one another at an axial point. For example, as shown, surfaces II, III of the system (respectively corresponding to lenses 1410, 1420) are in contact at an axial point C, while surfaces VI, VII of the system (respectively corresponding to lenses 1430, 1440) are in contact at an axial point S. According to the idea of the invention, at least one of the surfaces in a pair of mutually-contacting surfaces of the macro lens system of the invention is a prolate aspheric surface. For example, at least one of surfaces II, III has a prolate aspheric profile about the axis 1450. A lens with an aspheric surface (or asphere) is known in the art as a lens the surface profile of which is not a portion of a sphere or cylinder (or spherical or cylindrical surface). A surface profile of an aspheric is commonly defined as a function representing the displacement of the surface from the vertex at a given distance from the optical axis. Parameters of such function include the radius of curvature and the conic constant (or conic parameter) defined at the vertex. The prolate asphere is an aspheric surface the value of a conic constant of which is between −1 and 0. The term surface is used to denote a boundary between two media or bounds or spatial limits of a tangible element; the surface is understood as that which has length and breadth but not thickness.

Figure 2B:
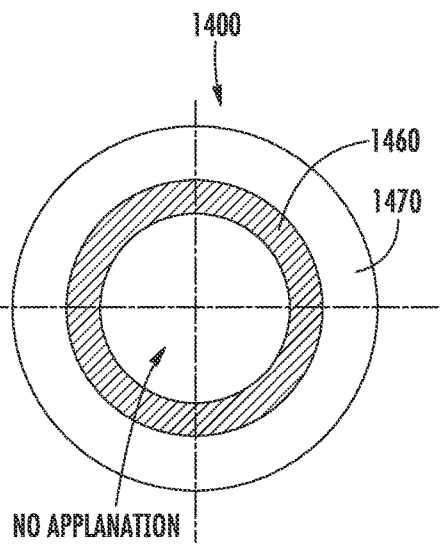

At the back portion of the housing 1460, an actuating piston 1470 is mated (as known in the art) such as to allow for application of pressure to the train of lenses as a result of movement of the piston 1470 along the axis 1450. FIGS. 2A and 2B illustrate the status of the embodiment 1400 when the piston 1470 is in a neutral position defined by no interactive axial force between a lens of the system and the surface of the piston. Under these circumstances, as seen in the front view of FIG. 2B, there is substantially no flattening of any of the internal surfaces of the lens system (stated differently, each of the constituent lenses 1410, 1420, 1430 and 1440 maintain their original shape). In operation (and in reference to FIGS. 3A, 3B), the piston 1470 is actuated along the axis 1450—for example, in the direction indicated by an arrow 1474 such at to apply axially-directed (directed along the optical axis) pressure to an individual lens of the system 1400.

Figure 3A:
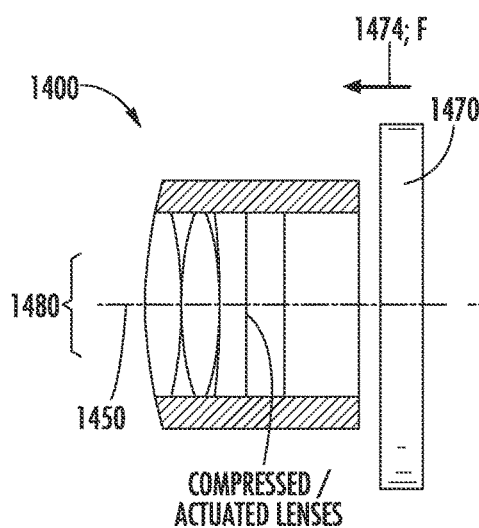
FIGS. 3A and 3B illustrate the side and front views of the embodiment of FIGS. 2A, 2B after the array of individual lenses of the embodiment has been axially compressed (that is, compressed along the axis)
Figure 3B:
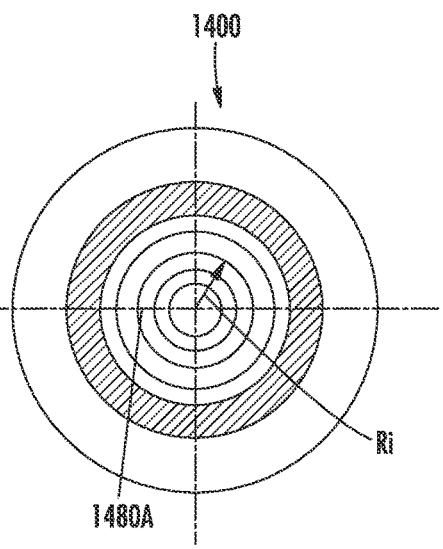

It is appreciated that, depending on a particular design, the piston 1470 can be specifically structured to apply pressure to either the outermost lens 1440 (thereby creating a force F directed along 1474 and axially-compressing the combination of lenses 1410, 1420, 1430, and 1440), or to another lens in the system. (In one specific implementation, for example, the piston 1470 can be structured to apply pressure to lens 1420, thereby axially compressing the lenses 1410 and 1420 such as to flatten or increase the radius of curvature of at least one of the mutually-facing surfaces II, III.) In the general case, however, as shown in FIG. 3A, the piston 1470 compresses the whole train of lenses of the embodiment 1400 by applying axially-directed force to the lens 1440, which is proximal to the piston 1470. As a result—and as a function of the strength of the axially—applied force caused by the movement of the piston 1470—at least one of the facing-each-other surfaces of the immediately-adjacent lenses is deformed in that, at such surface, an axially-centered applanated (that is, centered on the optical axis and flattened as compared to the shape of a stand alone lens) area 1480 is formed. A radius of the flattened area 1480 increases as a function of increasing force F. FIG. 3B illustrates a progression 1480A of such areas 1480 with respectively corresponding radii $R_i$ increasing as a function of increasing force F.

It is appreciated that, in one embodiment, both facing each other surfaces of the two immediately neighboring lenses are configured to change their curvatures at least at the respectively corresponding areas at and/or around the optical axis if the system. In one implementation of the system of FIGS. 2A, 2B, 3A, 3B, the curvatures of both surfaces II and III are reduced in response to repositioning of the piston 1470 towards the front of the macro lens 1400.

The process of flattening of the axially-centered area 1480 of at least one constituent lens' surface is reversible and repeatable as a result of repositioning of the piston 1470 in an opposite direction. To this end, the lens material works as a spring reversing the actuation of the lens in proportion to reduction in actuation pressure at the piston 1470.

In one specific implementation, the housing 1460 is a cylindrical construction made of a rigid material (for example, metal) while the actuating cylinder of the piston 1470 is made of an optically clear material having a modulus of elasticity of more than 1,000 kPA (such as poly-methylmethacrylate, PMMA, for example). The first lens 1410 in the series of lenses may be also made rigid with a high modulus of elasticity (such as that of PMMA). The remainder of the internal lenses (as shown, lenses 1420, 1430, and 1440) are constructed of a much softer material such as silicone, acrylic, or collamer having a modulus of elasticity within the range of 0.1 kPa to 100 kPa. At least one internal surface (such as surface II and/or surface III, for example) is compressed between the rigid piston 1470 and rigid lens 1410 upon the movement of the piston towards the front of the system 1400, thereby progressively negating the optical power contribution of such surface(s) to the overall lens system 1400 as the surface(s) flatten over an increasing diameter $2R_i$, as shown in FIG. 3B. Optionally but preferably, so deformable surface(s) is dimensioned to be a prolate aspheric with such a conic constant as i) to increase the sphericity of such surface as a result of progressive applanation caused by the mechanical compression due to force F, beginning at the apex of a given surface; ii) to minimize the discontinuity of spatial transition between the applanated portion of the surface (centered at the axis 1450) and the portion of the lens surface encircling such applanated area, and (iii) to minimize optical aberrations throughout the range of change of optical power such that, when mutually facing internal surfaces of the macro lens are being progressively applanated, the shape of the prolate aspheric surface in question becomes more oblate.

Materials, thicknesses, and lens surface curvatures are judiciously chosen such that the progressive "stepped" or "staged" applantation of the serial surfaces approximates a spherical lens over the entire amplitude of lens power. In other words, at least one of the adjacent opposing lens surface in question is defined such that, during a process of increase in a diameter of the applanated area in response to increase of force F, optical aberrations of the overall optical system that are caused by changes in such diameter are minimized The dimensions of the piston with respect to those of the housing shell are judiciously chosen to define a pressure, applied by the piston to a constituent lens of a macro lens, in an even manner around the flange ring of the piston. Depending on the size of the constituent lenses and stiffness of the lens material, the actuating force may be applied with the use of a piezo-electric crystal, a hydraulic pressure system, a servo motor, or a mechanical threading mechanism, to name just a few. Any of the constituent lenses (and, in particular, the lens a surface of which is being flattened as a result of application of the actuating force of the embodiment of the invention) may be surrounded by ambient medium including a housing-hollow-filling fluid (liquid or gas, for example air) with a refractive index that is smaller than that of the lens material. In this case, the overall optical power of the macro lens is caused to reduce by increasing the pressure extrernally-applied to the macro lens. Alternatively, in a specific embodiment, constituent lenses are disposed in a fluid (such as a silicone oil, for example) with a refractive index higher than that of the lens material such as silicone oil to reverse the direction of change of the diopteric optical power as a function of pressure applied to the macro lens. In this latter case, a given constituent lens of the macro lens, a surface of which is being flattened, increases its optical power progressively in response to the increased flattening of its surface.

In a related embodiment, the macro lens is structured as a series of multiple spatially-separated (along the optical axis) non-translating lens subsystems, each of which can be reversibly and independently compressed along the optical axis to create a magnifying system and sensor/eye focusing system. Examples are provided by spatially-separated from one another lens subsystems dimensioned to have a common focal point. Generally, the actuation pressure of lens assembly(ies) can be structured in response to the desired magnification while maintaining such common focal point. In addition, a sensor (optical detector) can be disposed (whether repositionably or in a fixed position) in the vicinity a focal plane of the overall macro lens.

An applanating variable-focus macro lens system structured according to the idea of the invention is configured to operate within the range of accommodation of optical power of up to 60 diopters. Negating the optical power contribution provided by the six internal surfaces of the embodiment 1400 (surfaces II, III, IV, V, VI, and VII), for example, by the staged applanation show in FIG. 3B reduces the optical power of the lens system by about 60 diopters if each of these internal surfaces contributes, on average, of about 10 diopters of optical power to the overall optical power o the system 1400. Generally, to maximize the range of the variable optical power, the macro lens system requires a minimal actuation force—of a few grams of force, for example—and, in some implementations, about 100 microns of axial movement for a constituent lens. The actuation force applied by a piston of an embodiment of the invention is implemented, in one embodiment, with either piezoelectric crystal or a conventional pressure actuator (not shown for simplicity of illustration).

EXAMPLE II

A Multi-Lens Embodiment

Figure 4A:
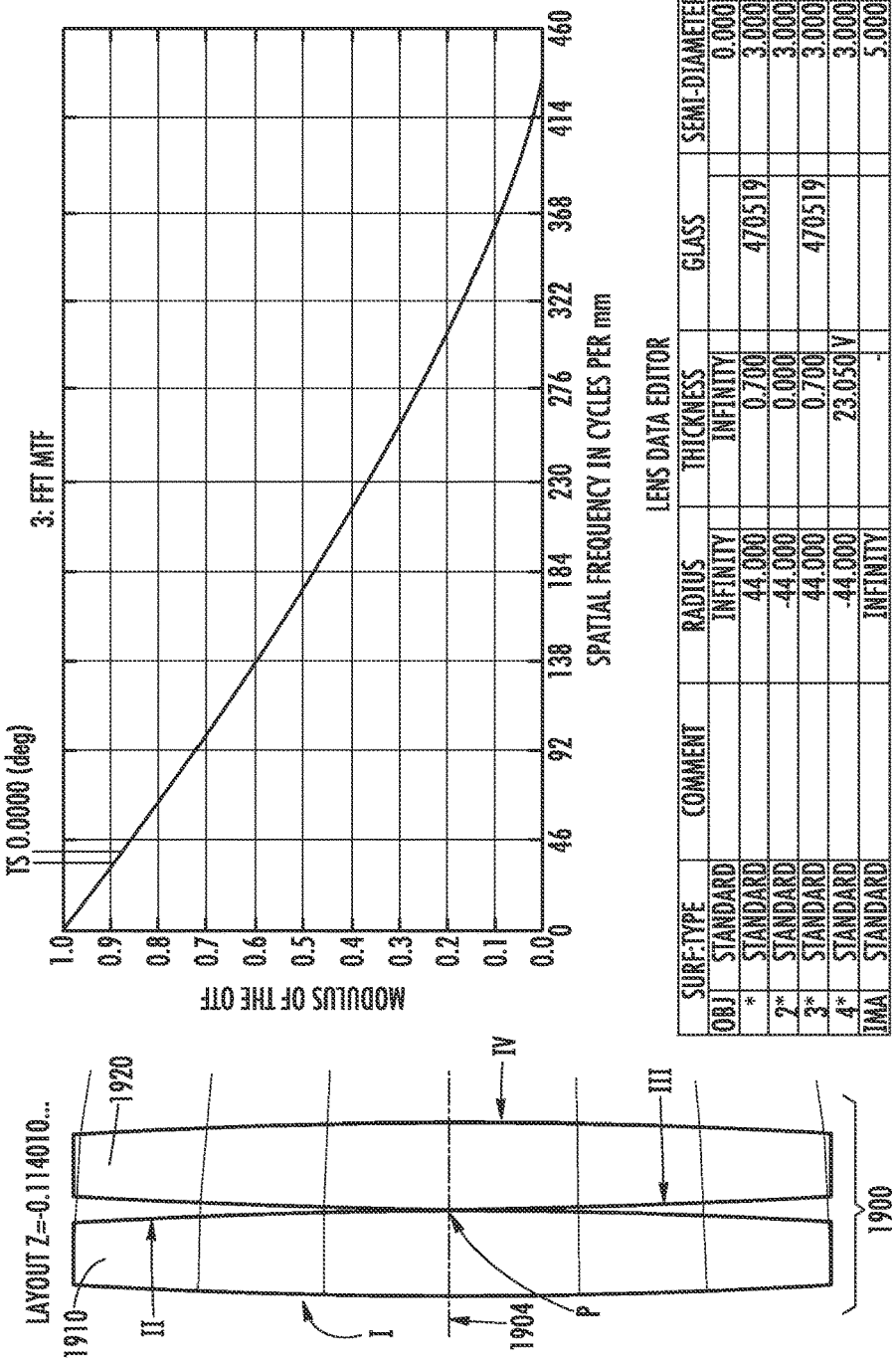
Figure 4B:
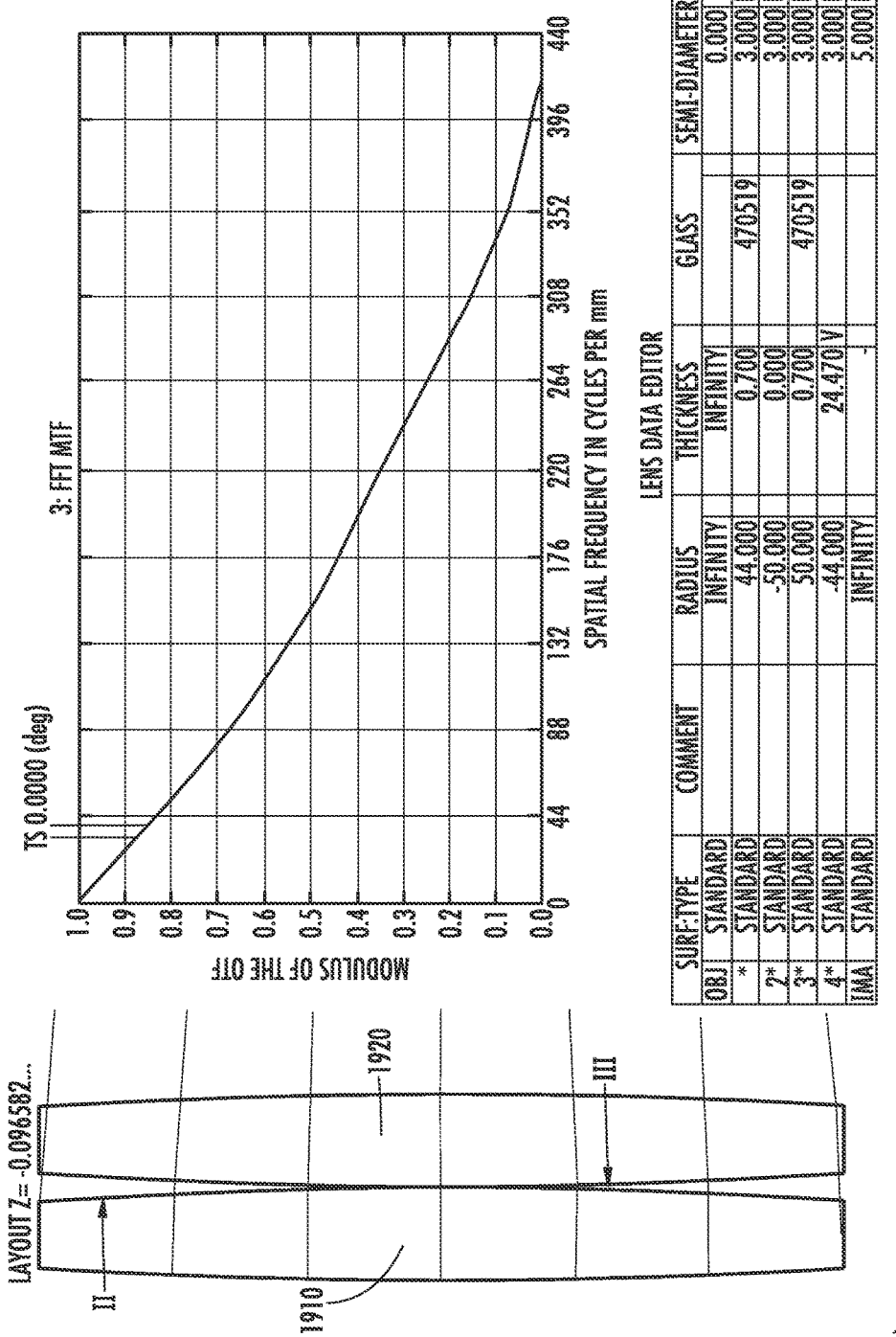
Figure 4C:
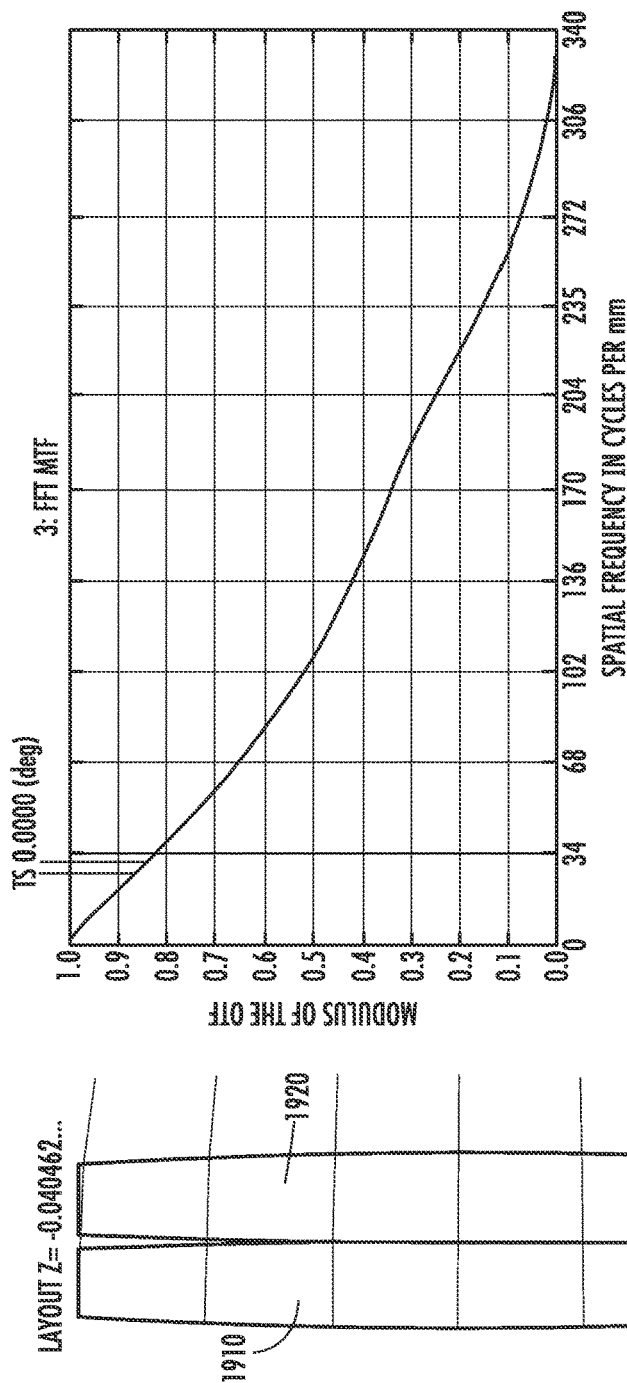
Figure 4D:
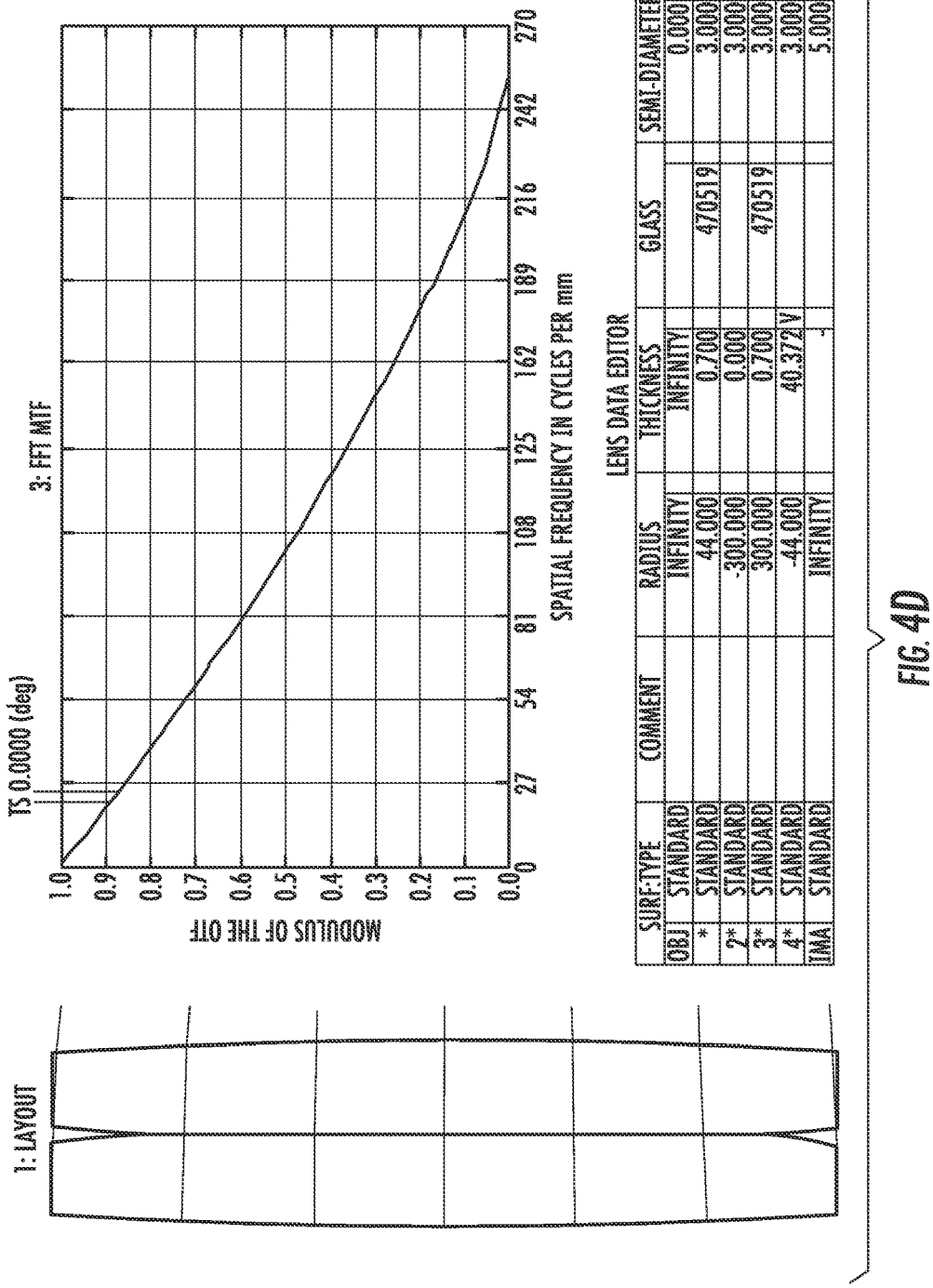
Figure 4E:
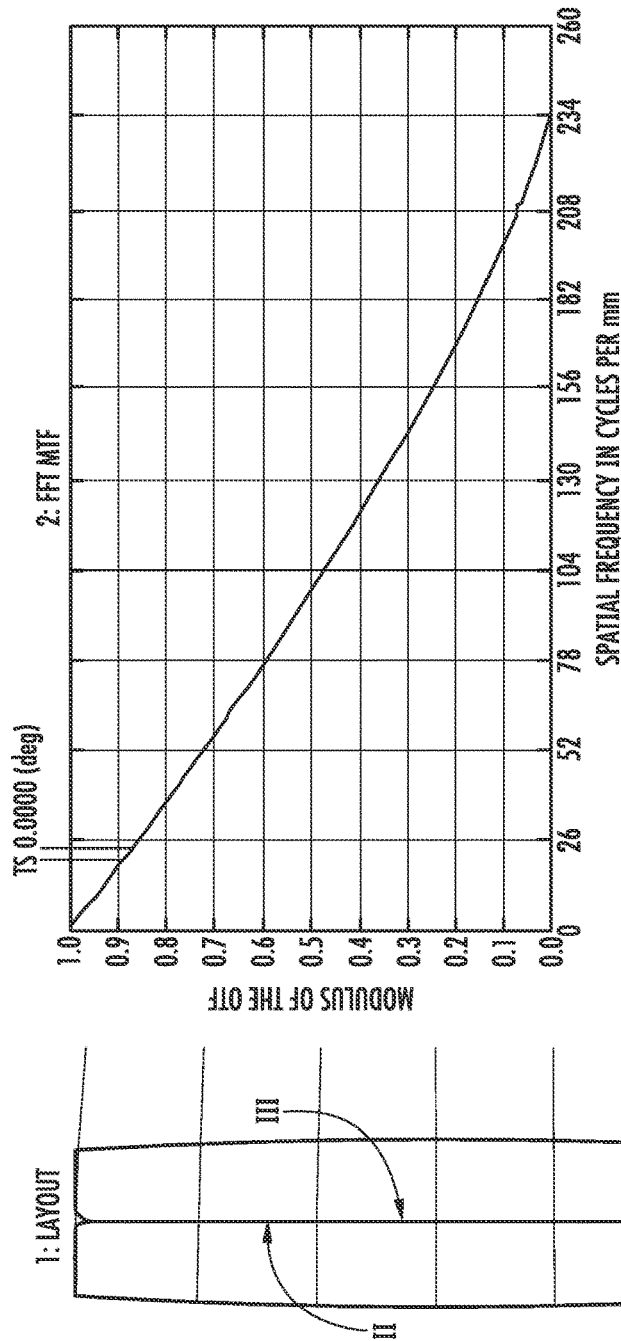

As shown in a specific embodiment of FIG. 4A, a macro lens 1900 having an optical axis 1904 is formed by two axially-contacting lenses 1910, 1920. The design parameters of the layout 1900 in the unstressed state (that is, when the mutually-contacting surfaces II, III are not deformed) are shown in FIG. 4A. It is appreciated that the data column labeled Glass generally contains materials for individual lenses that may differ from glass materials and that can include plastic materials, for example. In this specific case, for example, both lenses 1910 and 1920 are made of silicone.

Figure 5:
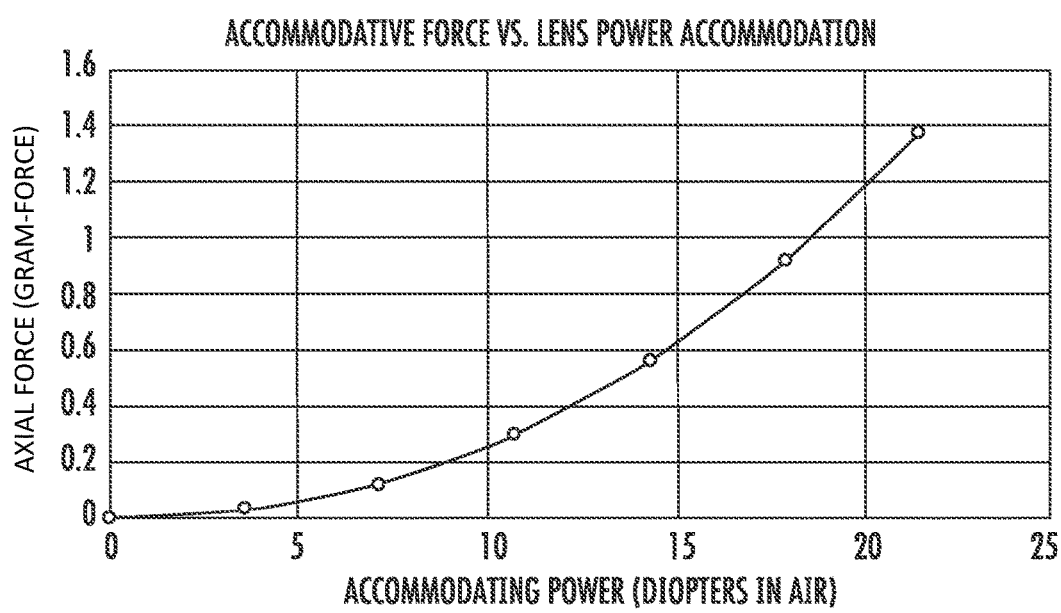
FIG. 5 is a plot showing a dependence of change of optical power of an embodiment of a macro lens as a function of compressive force applied axially to constituent lenses of the embodiment.

FIGS. 4A, 4B, 4C, 4D, 4E, and 4F depict a progression of the deformation of both of the constituent lens(es) 1910, 1920 (of the same embodiment 1900) and of the image quality as a function of a compressive force that is reversibly applied to surface IV and directed axially (along the optical axis of the lens 1900) towards surface III by a piston mechanism of a housing structure (not shown) in which the macro-lens 1900 is supported. A corresponding dependence of the change in optical power of the macro lens 1900 on the strength of such axial force is shown in FIG. 5. For each of the steps of the progression of the deformation, a plot of the optical transfer function (OTF) is provided accompanied, in insets, by Zemax® data (marked as "Lens Data Editor") that described the train of the lenses 1910, 1920 and a schematic diagram of these two lenses.

As shown in FIG. 4A, in the unstressed state of the macro lens system 1900 (i.e., when the constituent individual lenses 1910, 1920 are in contact at an axial point P without any interactive force between them, the shapes of the surfaces II, III in the regions of their apexes are prolate aspheric with respective conical constants of −12 and −15, while the radii of the spherical curvature of these surfaces are −44 mm and 44 mm, respectively. The effect of flattening of the surfaces II, III is shown in discrete steps, corresponding to changes of the radii value as well as the conical constants of the corresponding apexes. The progressive applanation of the surfaces II, III results in changes of their radii to (−500 mm, 500 mm) in FIG. 4E and, in FIG. 4F, the near-axial area of the surfaces II, III is shown to be applanated (flattened) substantially all the way across their surfaces. The two-lens macro lens system 1900 specifies an overall optical power change across a 21.7 diopter range and a corresponding change in a cut-off frequency of the modulation transfer function from about 445 lines per mm (FIG. 4A) to about 225 lines per mm or so (FIG. 4F) at the surprisingly small operational expense of applying a minute axial force of less than 1.6 grams of force (gram-force), as shown in FIG. 5. The force-optical-power curve of FIG. 5 illustrates data acquired with finite-element analysis.

Figure 6:
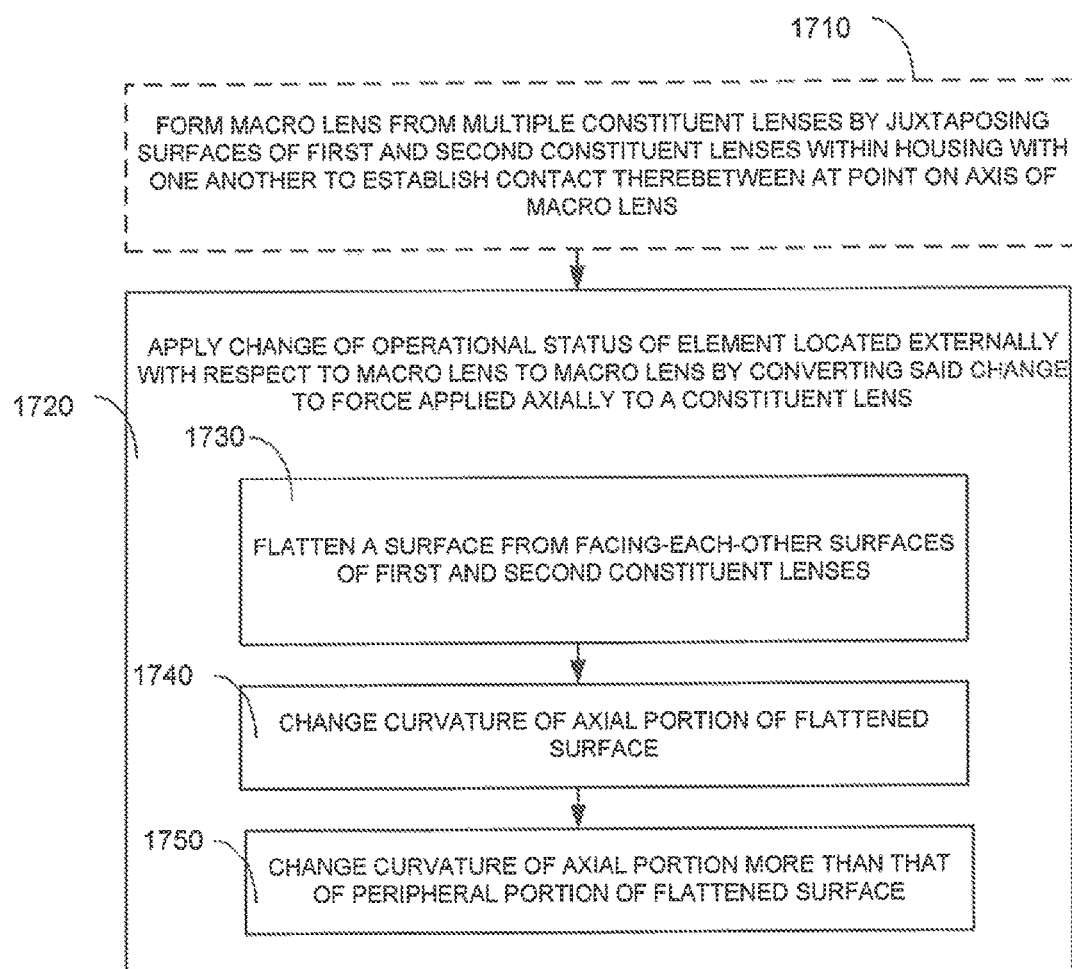
FIG. 6 is a flow-chart schematically depicting a method according to an embodiment of the invention.

FIG. 6 presents a schematic flow-chart of a method of operation of an embodiment of the invention. Here, the operation of the embodiment may be initiated by either compressing a group of individual constituent lenses (that have been already pre-assembled, at step 1710, into an optical train of a resulting macro lens) with an external compressing member such as a piston (in a specific implementation) cooperated with the housing of the macro-lens or, alternatively, by forming such assembly at step 1710 to begin with. The step of formation of a macro lens of an embodiment of the invention includes cooperating surfaces of first and second lenses with one another such as to establish a contact between these surfaces at an axial point (i.e., at apexes of the surfaces, located on the optical axis). In a specific implementation, at least one of the contacting-each-other surfaces can be shaped as a prolate aspheric. At step 1720, the operational status of an element of the macro lens harness is changed to produce vectored force applied to a constituent lens of the macro lens along the optical axis. The change in operational status may include, for example, a change in position (in case of a mechanical piston or compressor), a change in voltage (applied to a piezoelectric element), a change in pressure i (in case of pneumatic element). The so-formed vectored force is transferred to a lens of the system to change area of contact of mutually-facing surfaces of the immediately adjacent lenses of the system causing, at step 1730, a change in curvature of at least one of the mutually-contacting surfaces. In a specific embodiment, the step of flattening may be accompanied by reduction of curvature of an axial portion of at least one of such surfaces, 1740. Optionally, at step 1740, when the so-flattened surface is a prolate aspherical surface, the curvature of the axial portion of the prolate aspherical surface can be intentionally changed more than the curvature of the peripheral portion of the prolate aspherical surface (which encircles the axial portion).

EXAMPLE III

A Multi-Lens Embodiment

Figure 7A:
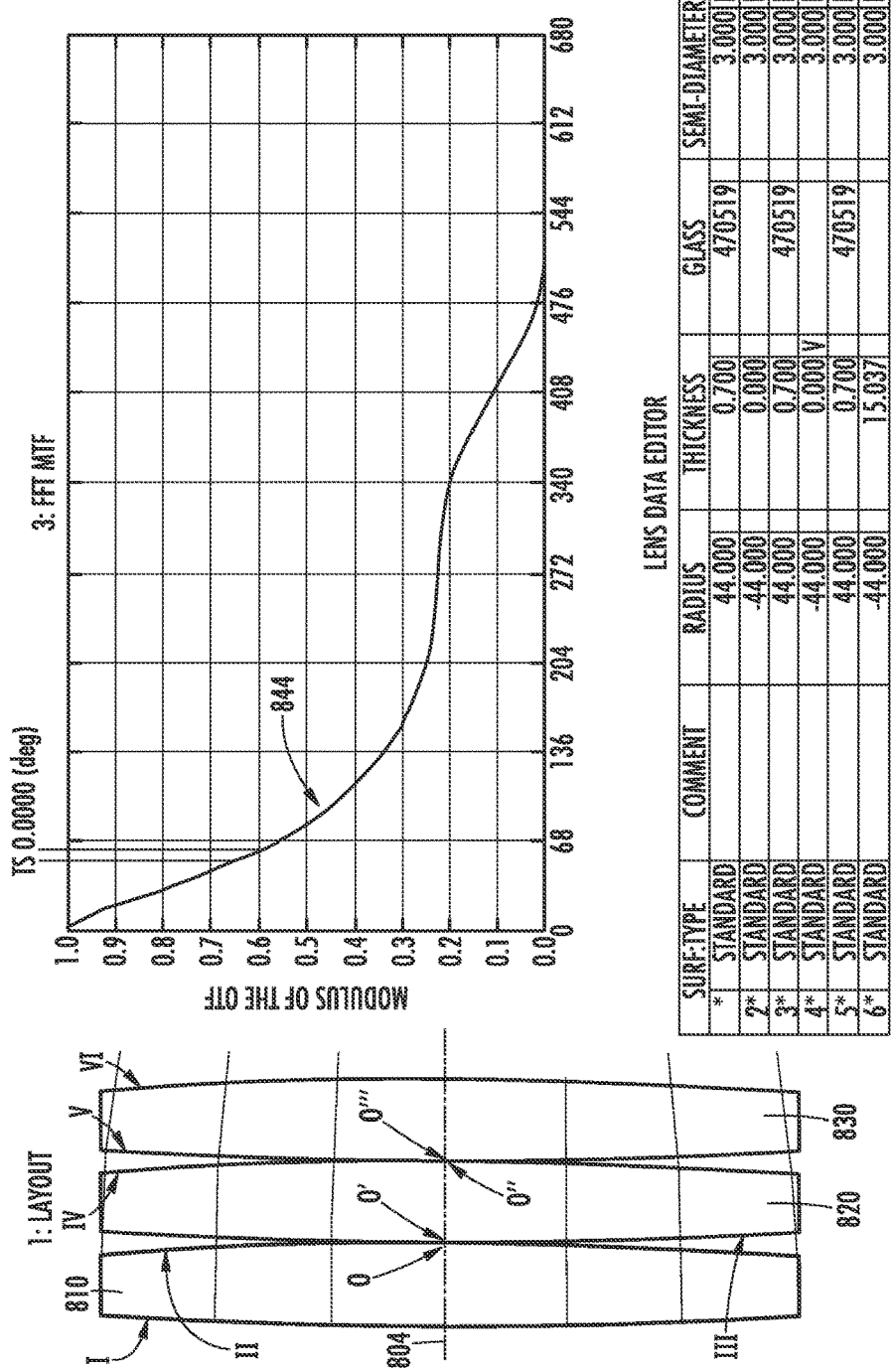
FIGS. 7A, 7B summarize data representing changes of operational characteristic of a related embodiment of the invention (comprising three constituent lenses) as a function of a degree of flattening of contacting each other surfaces of constituent lenses of the embodiment.
Figure 7B:
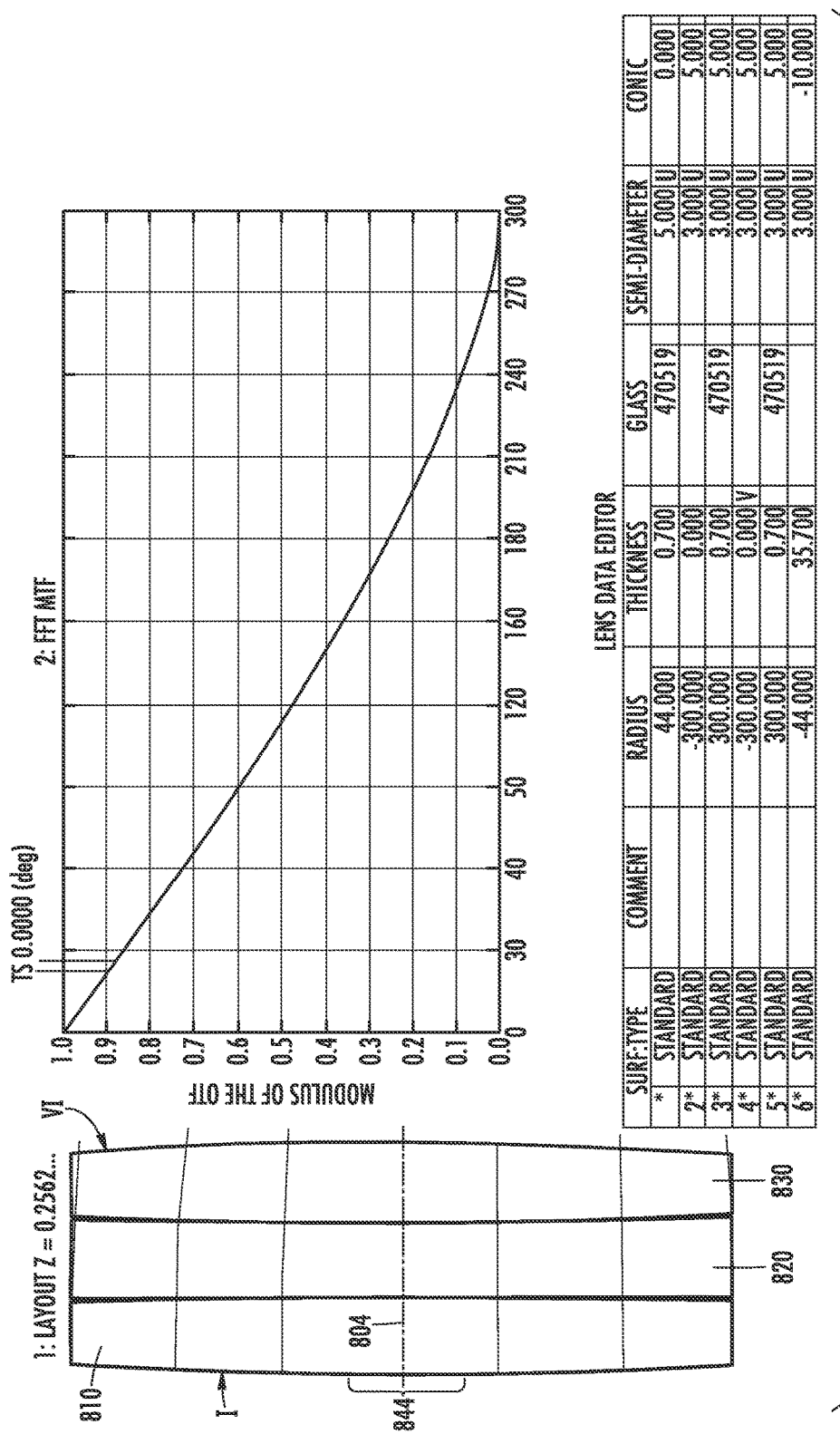

A related embodiment 800 including three co-axially-disposed lenses in the train of lenses (FIGS. 7A, 7B)

demonstrated a 43.4 diopter power change occurring during a similar surface-applanating progression when the internal surfaces of the embodiment are completely applanated (flattened). In comparison with the embodiment 1900 of FIGS. 4A-4F, this requires an increase of the range of axial repositioning of the piston 1450 of the housing harness arrangement. For simplicity of illustration, the embodiment 800 is shown without a housing harness and a piston/compressor arrangement. FIG. 7A illustrates the layout of a three-lens embodiment 800 with an optical axis 804, in which the immediately-adjoining ones of the lenses 810, 820, and 830 are in physical contact with one another in an unstressed state. In other words, the lenses 810 and 820 are in contact at the axial points O, O' of the surfaces II and III, and the lenses 820, 830 are in contact at the axial points O", O'" of the surface IV and V. FIG. 7A also provides a curve 840 representing the modulation transfer function (MTF) for the embodiment and the Zemax lens data for such an unstressed state. The shapes of lenses 810, 820, 830 in a stressed state (caused by applying an axially-directed force to surface VI towards surface I, while lens 810 is fixated in the housing harness) corresponding to the increase of the radii of curvature of the internal surfaces of the lens 800 from modulus 44 mm to modulus 300 mm), are shown in FIG. 7B, where the flattened areas of the internal surfaces II, II, IV, and V are schematically and not to scale aggregately marked as 844. It is appreciated that an embodiment with more than three sequentially-disposed individual lenses would be structured in a substantially similar fashion, in which case an even larger change in focal length can be achieved.

As was already discussed above, the plot of FIG. 5 illustrates the dependence of axial force required to be applied, with the piston 1470 for mutual applanation of surfaces II, III of the embodiment having two constituent lenses (such as the embodiment 1900 of FIGS. 4A through 4F), as a function of a change in optical power of the lens system. In further reference to FIGS. 2(A, B), 3(A, B) it can be shown that, with increase in number of lenses in the train and in number of inner surfaces that are being deformed as a result of the operation of the axial compressor (piston) of the invention, the overall change in the optical power of the system of lenses in the housing 1460 and driven by the piston 1470 increased by deforming each of the inner surfaces of an embodiment containing more than two individual lenses (for example, the embodiment 800 of FIGS. 7A, 7B) to the same degree as the inner surfaces of an embodiment having only two individual lenses (for example, the embodiment 1900).

At the same time, the results of applying the axially-directed vectored force (to the train of coaxial lenses) that has the same modulus differ depending on the number of lenses in the train. For example, comparing a first macro lens (containing a single, only lens) with a second macro lens (containing multiple constituent individual lenses with mutually flattening opposing surfaces, which lenses are identical to one another and each of which is the same as the single lens of the first macro lens): the overall optical power of the second macro lens with two constituent lenses in an unstressed state can be reduced by 50%; the overall optical power of the second macro lens with three constituent lenses in an unstressed state can be reduced by about 67%; and the overall optical power of the second macro lens with four constituent lenses in an unstressed state can be reduced by about 75%, when the axially-directed vectored force is chosen such as to completely flatten mutually-facing internal surfaces of the constituent lenses.

EXAMPLE IV

A Macro Lens Containing Multiple Independent Multi-Lens Subsystems

FIGS. 8A, 8B illustrate a related embodiment 1600 structured to form a macro lens configured to provide a large variation of the optical power as a result of applanation of surfaces of lenses that are constituent to the embodiment 1600. The range of optical power variation achievable with this embodiment is as high as 60 diopters.

The optical train of the system 1600 is contained in the same cylindrical volume 1604A defined by the housing shell 1604, and contains concatenated co-axially about the optical axis 1608 lens sub-systems 1610, 1620. According to an idea of the invention, the lens subsystem 1610 includes at least two sequences of multiple lenses each. The optical power of one of the lens subsystems has a sign that is opposite to that of the optical power of another sub-system. In the specific example of embodiment 1600, the sub-system 1610 has an overall positive optical power and includes a plurality of individual lenses (shown as three lenses 1610A, 1610B, 1610C) at least two of which have opposing surfaces contacting each other at an axial point in an unstressed state (i.e., in the absence of axial pressure applied to such plurality of lenses). The sub-system 1620, on the other hand, is shown as a group of lenses 1620A, 1620B, 1620C possessing, aggregately and as a sub-system, negative optical power and separated with a gap 1630 from the sub-system 1620. At least two of the lenses 1620A, 1620B, 1620C have surfaces contacting each other at an axial point in the unstressed state. The operation of such macro lens requires the application, along the optical axis 1608, of a minimal actuation force of a few grams of force (gram-force); the lens 1600 attains a 20× optical zoom without lens movement or movement of the detector element used (in optical communication with such lens, not shown) to capture the image. In addition, about 100 microns of axial lens movement can be judiciously effectuated to maximize the range of lens power variation. In one embodiment, the only driving influences such as vectored forces are applied to sub-systems 1610, 1620 to both i) actuate the zoom of the macro lens and ii) focus the image on the detector. In terms of the operational dimensions it is recognized that a 20× optical zoom lens 1600 with a 6 mm entrance pupil constructed according the principles of this invention defines an axial foot-print (an area representing a projection of the macro lens along the optical axis 1608 onto a plane perpendicular to the optical axis) of about the size of a thumb nail (about 7 mm by 10 mm) with an F-number as low as 2.0 and a full field of view (FOV) ranging from about 40 degrees to about 12 degrees at full zoom.

In one embodiment, lenses in individual groups of lenses 1610, 1620 can be actuated such that actuation of one group of lenses is not connected with or affect the actuation of another group of lenses. For example, as shown, this can be achieved with structuring the means for applying axial pressure to the optical train of the system 1600 as a combination of two pistons 1670A and 1670B, operable individually within the housing shell 1604 and without interference with one another, one at a time or contemporaneously. (In practice, this is achievable, for example with a simple piezo crystal or pressure actuator each of which is available "off the shelf".)

In one embodiment, the rigid housing cylinder (cover) 1604 and an optically clear rigid actuating cylinders 1670A, 1670B are made of material having a modulus of elasticity of more than 1000 kPa (such as poly methyl methacrylate or PMMA, for example). The internal, individual lenses of ether of the first and second subsystems are made of a material that is much softer than that of the housing and/or pistons, such as silicone, acrylic, or collamer having a modulus of elasticity of 0.1 to 100 kPa (the value of the refractive index is within the approximate range from 1.3 to 1.5).

The lens subsystem 1610 is a positive applanating lens subsystem configured according to the principles discussed in this disclosure such that its refracting power is reduced with the increase in axial pressure applied to a lens of the subsystem. In one implementation (shown in FIG. 8A), the second lens subsystem (sub-system 1620) is a positive lens contraption in a Keplerian configuration, in which the spaces between the surfaces of individual lenses 1620A, 1620B, 1620C are filled with air. In a related embodiment (not shown), the subsystem 1620 is a negative lens contraption disposed relatively to the subsystem 1610 in a Galilean configuration. (In a specific case of the embodiment of such negative power subsystem where the subsystem 1620 having a negative optical power and forming, together with the positive subsystem 1610, a Galilean arrangement, the subsystem 1620 is formed of positive lenses separated by high index of refraction fluid, filling the spaces 1673, instead of air.) The compression of each of the first and second lens subsystems with pistons is operated independently to produce magnification and to focus an image on the detector (not shown).

The internal applanating surfaces are compressed between the rigid piston element and a portion of the rigid cover (such as the piston 1670A and the portion 1680; or the piston 1674B and the portion 1682). The internal individual lens surfaces that are facing each other (opposing surfaces) are applanated (flattened) against each other to form a progression of flat areas, centered at the optical axis, with progressively bigger radius as a function of the strength of the vectored force. Such change in curvature of lens surfaces causes progressive negation of the power contribution of these surfaces to the overall lens system as the surfaces applanate over an increasing diameter. In a likewise manner, the negative lens system is the same construction as the positive system except the lenses are spaced by a high refractive index fluid such as silicone oil (refractive index of about 1.5).

In one specific case, at least one of the housing portions 1680, 1682 is annular (dimensioned such that only a peripheral portion of the immediately adjacent lens can come to contact in such portion). In another specific case, when the housing is made from optical-transparent material, the portions 1680,1682 of the housing shell can be structured as solid portions extending transversely across the optical axis and the clear aperture of the immediately adjacent lens (in the example of FIG. 8A, lenses 1610A, 1620A). So configured, the identified portions of the housing can be shaped as optical lenses themselves and judiciously dimensioned to contribute to the overall optical train of the macro lens. In such specific case, the lenses 1610A, 1620A can be in physical contact with portions 1680, 1682 respectively. The incident-light facing surfaces of lenses 1610A, 1620A form flat areas (are applanated), symmetrically about the optical axis, with radii of applanation progressively increasing as a function of increasing unidirectional repositioning of pistons 1670A, 1670B from their initial positions corresponding to unstressed state of the lenses along the axis 1608. Such specific configuration of identified portions of the housing allows to take advantage of additionally changing the optical power of the overall macro lens due to applanation of lens surfaces that are outer surface in a corresponding group of lenses, and that otherwise would not be used at all.

At least one of the internal opposing lens surfaces within at least one of the subsystem 1610, 1620 is shaped to define a prolate aspheric surface, for example, so that the mechanical compression (beginning at the apex of the surface at the moment when the vectored force is applied axially to a lens of the subsystem to define a stress therein) to increase the radius of curvature of a surface and a sphericity of the interface as the opposing surfaces applanate, and to minimize the discontinuity of the transition between a flattened portion of a given applanated surface (centered on the axis 1608) and the surrounding, peripheral portion of such surface and associated optical aberrations. The materials, thicknesses, and lens surface curvatures are varied such that the progressive "stepped" applanation of the serial surfaces approximates a spherical lens over the entire amplitude of lens power. The lens material works as a spring reversing the actuation of the lens in proportion to reduction in actuation pressure.

Figure 9A:
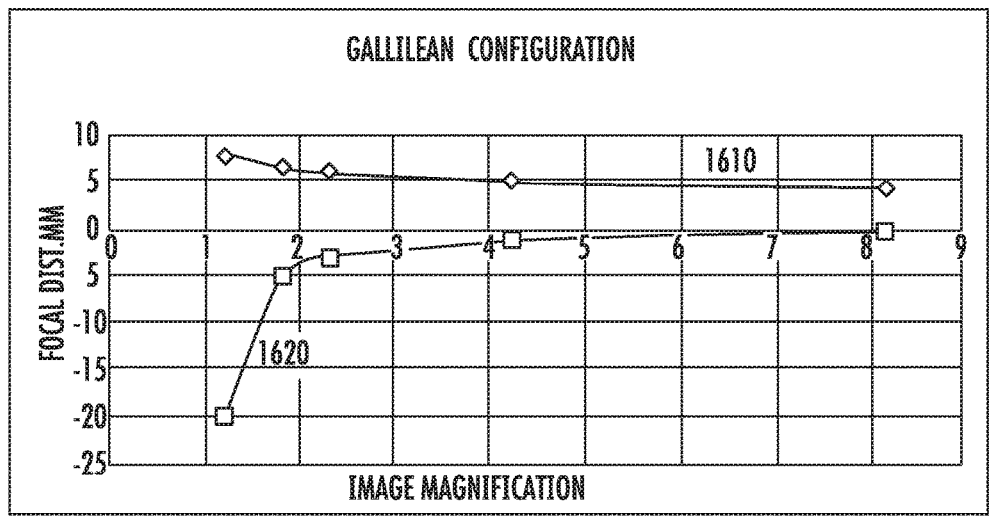
FIG. 9A contains plots representing focal lengths of the anterior and posterior subsystems of lenses of the embodiment of FIGS. 8A, 8B in a case when the anterior subsystem has a positive optical power, the posterior subsystem has a negative optical power, and the anterior and posterior subsystems are spatially coordinated in Galilean configuration with respect to one another.

FIG. 9A provides plots of the variable lens powers for each of the front and rear subsystems 1620A, 1620B disposed in series in a Galilean configuration to produce up to a 10× optical magnification. The variable power curves were defined from the Zemax® modeling with a 6 mm diameter front lens subsystem 1610; the lens 1610A was stopped against the portion 1680 of the housing. The diameter of the lens 1620 was chosen to be 6 mm as well. The separation between the back surface (surface VI) of the lens 1610 and the front surface (surface VII) of the rear lens 1620 was chosen to be 5 mm. The lens 1620A was stopped against the portion 1682 of the housing; a back focal distance of the macro lens 1600 to the detector was defined as 5 mm.

Figure 9B:
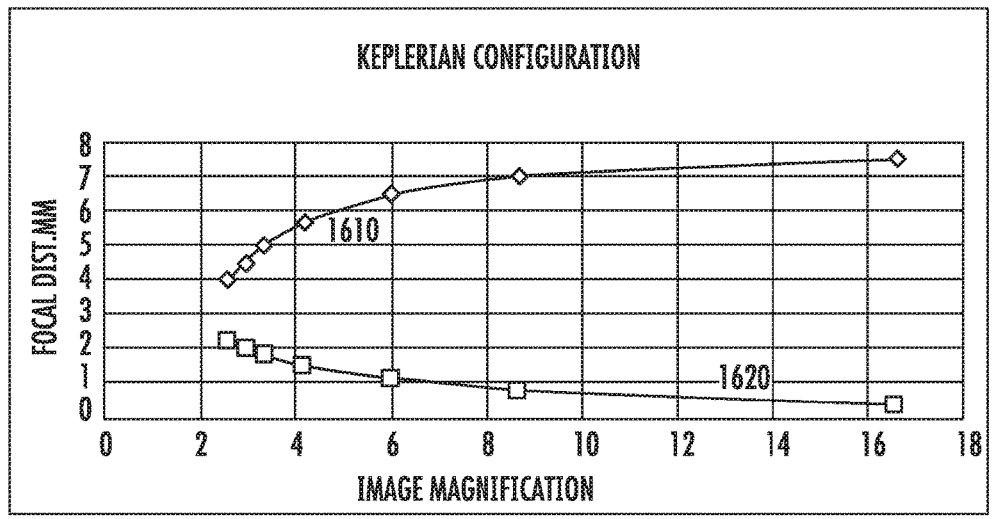
FIG. 9B contains plots representing focal lengths of the anterior and posterior subsystems of lenses of the embodiment of FIGS. 8A, 8B in a case when both the anterior and posterior subsystems have corresponding positive optical powers, and the anterior and posterior subsystems are spatially coordinated in Keplerian configuration with respect to one another.

FIG. 9B provides plots of the variable lens powers for each of the front and rear subsystems 1620A, 1620B disposed in series in a Keplerian configuration to produce up to a 20× optical magnification. The variable power curves were defined from the Zemax™ modeling with a 6 mm diameter front lens subsystem 1610; the lens 1610A was stopped against the portion 1680 of the housing. The diameter of the lens 1620 was chosen to be 6 mm as well. The separation between the back surface (surface VI) of the lens 1610 and the front surface (surface VII) of the rear lens 1620 was chosen to be 8 mm. The lens 1620A was stopped against the portion 1682 of the housing; a back focal distance of the macro lens 1600 to the detector was defined as 5 mm.

Figure 10A:
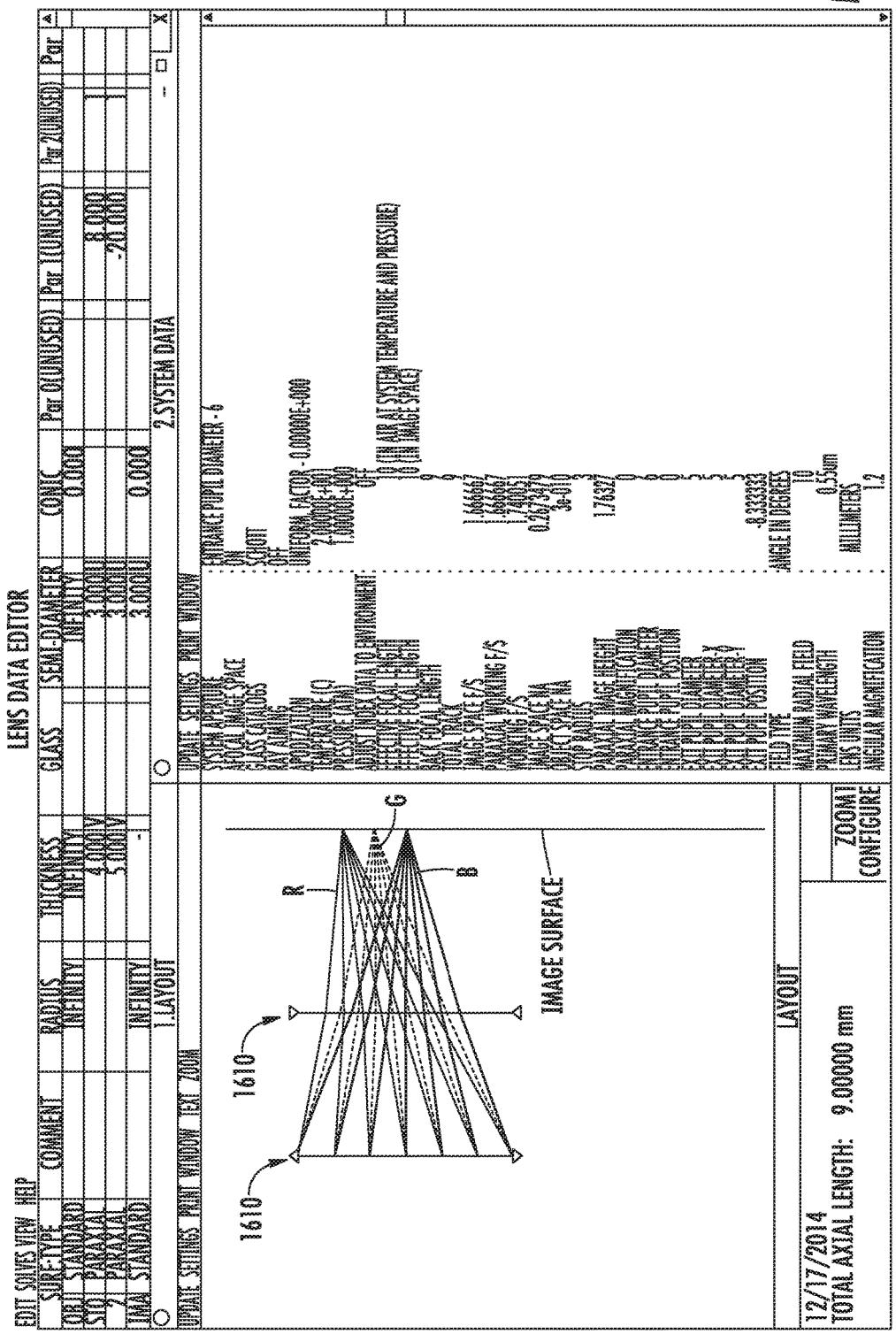
FIGS. 10A, 10B present Zemax data representing the embodiment of FIG. 9B at two different operational points.
Figure 10B:
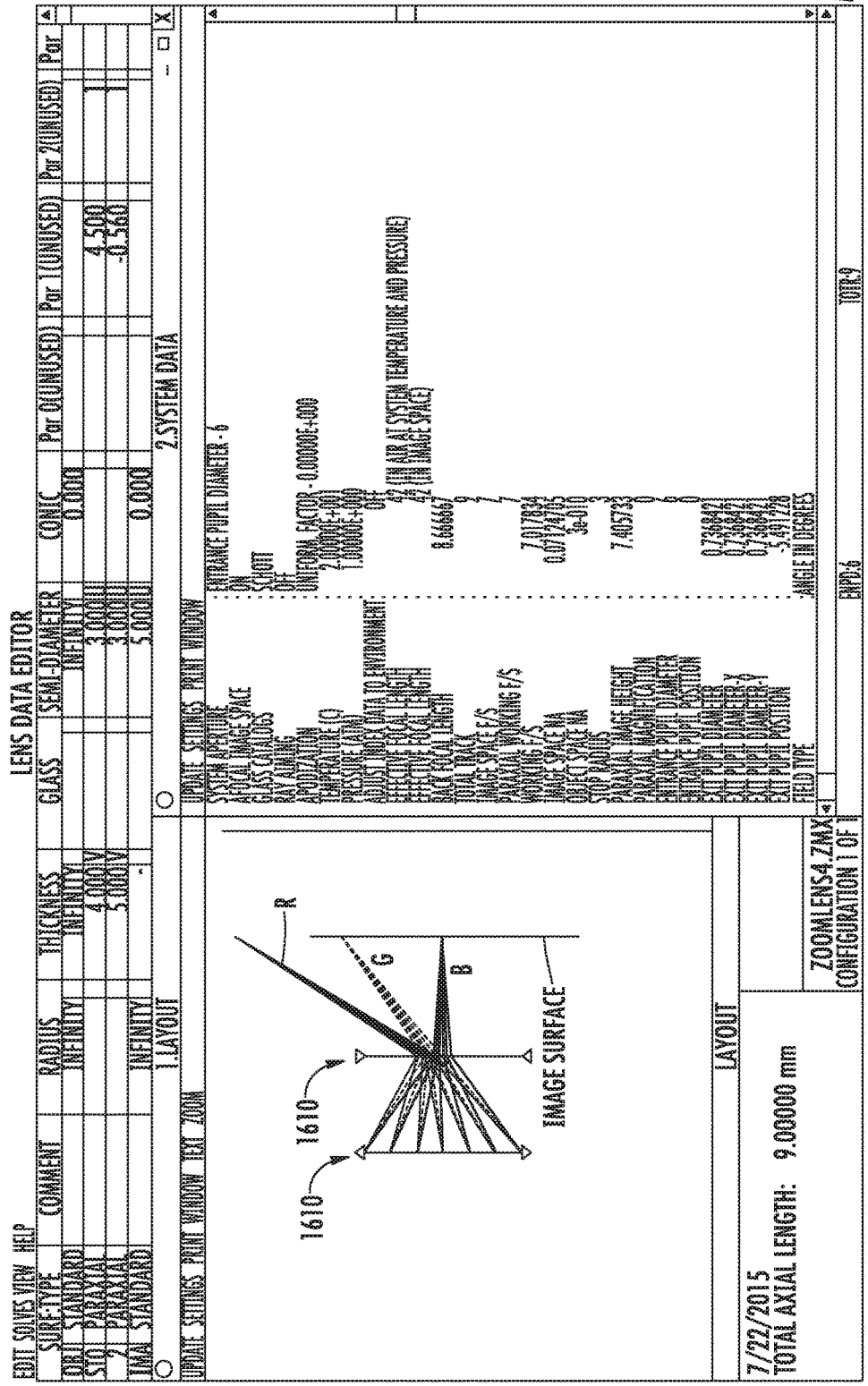

FIGS. 10A and 10B illustrate operational parameters of the macro lens defined by a positive lens sub-system 1610 and a negative lens subsystem 1620 oriented with respect to one another in a Keplerian configuration. FIG. 10A illustrates the unstressed state (in which the overall effective focal length of the macro lens 1600 is equal to 10 mm), while FIG. 10B illustrates the stressed state resulting from flattening of an axial region of at least one of the surfaces of at least one of the constituent lenses of at least one of the subsystems 1610, 1620. The effective focal length of the macro lens in such stressed state is 42 mm. (The labels R, G, B denote the transmission of light at primary default red, green and blue wavelengths as set in Zemax.) The data of FIGS. 10A, 10B show change in magnification at two discrete points in a continuous range of the change of optical power with this macro lens train, while maintaining the distance between the subsystems 1610, 1620 as a constant and the separation between the last (back) surface of the macro lens 1600 and the image plane constant.

Figure 11:
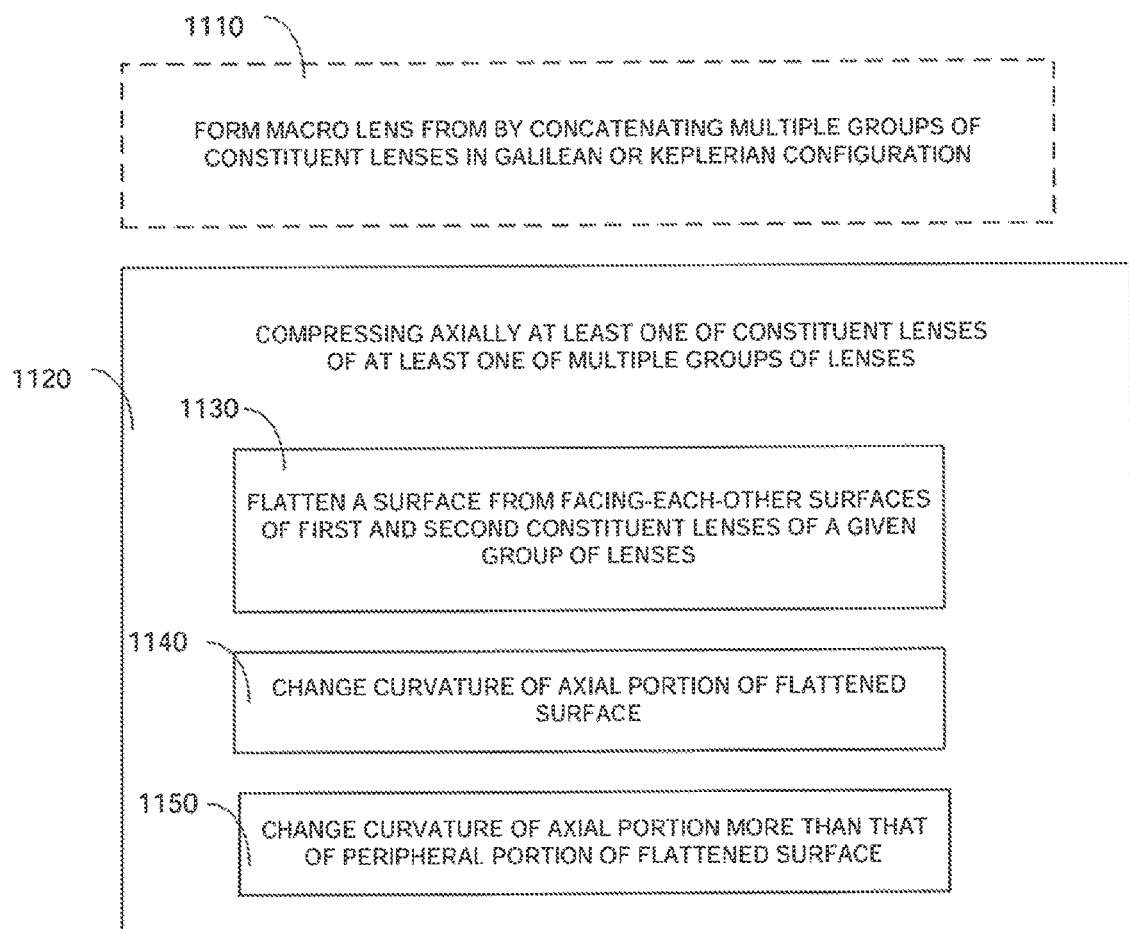
FIG. 11 is a flow-chart schematically depicting a method for operation of the embodiment of FIGS. 8A, 8B.

FIG. 11 presents a schematic flow-chart of a method of operation of an embodiment structured according to either a Keplerian or Gallilean configuration as generally discussed above in reference to FIGS. 8A, 8B. The operation of the embodiment is initiated by axially compressing, at step 1120 at least one of the multiple groups of individual constituent lenses (each of which groups has been already pre-assembled, at step 1110, into an optical train of a resulting macro lens) with a respectively-corresponding of multiple external compressing members such as pistons, for example. The respectively-corresponding piston(s) are operably cooperated with the housing of the macro-lens.

Alternatively, by the method is initiated by positioning multiple spatially-separated groups of individual constituent lenses co-axially with respect to one another, at step 1110, to form a macro lens. When a first of the multiple groups of lenses is structured to have a positive optical power and a second of the multiple groups of lenses is structured to have a negative optical power, the resulting macro lens is structured to have a Galilean configuration. When each of the first and second of the multiple groups of lenses has a corresponding positive optical power, the resulting macro lens is structured to have a Galilean configuration. The formation of a macro lens at step 1110 may include a formation of a group of individual lenses having, aggregately, as a group, a negative optical power by embedding a group of lenses having aggregately positive optical power in a medium with an refractive index exceeding the index of the material from which such lenses are made. The step of formation of a macro lens of an embodiment of the invention includes cooperating surfaces of first and second lenses of multiple lenses of a given group of lenses with one another to establish a contact between these surfaces at an axial point (i.e., at apexes of the surfaces, located on the optical axis).

In one implementation, at least one of the contacting-each-other surfaces can be a prolate aspheric surface. (In a specific, a spatially limited portion of at least one of such surfaces that is immediately proximal to the optical axis has a shape defined by a conic constant having a value within the range from −1 to 0.) At step 1120, the operational status of an element of the macro lens harness is changed to produce vectored force applied to a constituent lens of the macro lens along the optical axis. The change in operational status may include, for example, a change in position (in case of a mechanical piston or compressor), a change in voltage (applied to a piezoelectric element), a change in pressure i (in case of pneumatic element). The so-formed vectored force is transferred to a lens of the system to change area of contact of mutually-facing surfaces of the immediately adjacent lenses of the system causing, at step 1130, a change in curvature of at least one of the mutually-contacting surfaces. In a specific embodiment, the step of flattening may be accompanied by reduction of curvature of an axial portion of at least one of such surfaces, 1140. Optionally, at step 1140, when the so-flattened surface is a prolate aspherical surface, the curvature of the axial portion of the prolate aspherical surface can be intentionally changed more than the curvature of the peripheral portion of the prolate aspherical surface (which encircles the axial portion).

A skilled artisan appreciates, therefore, that a method for operating a macro lens (that has at least first and second lenses) according to the idea of the invention generally includes (i) transmitting light, incident onto a front surface of the macro lens, through two surfaces of the macro lens (that are in contact with one another at a first contact area that is centered on the optical axis) to form a first image, the first contact area having a first surface area; and (ii) axially repositioning a first of the two surfaces with respect to a second of the two surfaces in a first direction along the optical axis to form a second contact area between the first and second of the two surfaces, the second contact area having a second surface area, the first surface area and the second surface area being different from one another. In a specific implementation, the step of axially repositioning is effectuated without changing axial positions of the first and second constituent lenses. The method further includes axially repositioning the first of the two surfaces with respect to the second of the two surfaces in a second direction (that is opposite to the first direction) along the optical axis to form a third contact area between the first and second of the two surfaces, where the third contact area has a third surface area (which, optionally, is equal to the first surface area). Alternatively or in addition, the method includes a step of transferring mechanical energy from an element external to the macro lens (for example, to a peripheral portion of at least one of the first and second constituent lenses) and/or a step transmitting the incident light through the macro lens having the second contact area to form a second image. A method may further include a step of changing a value of a conic constant of at lest one of the first and second of the two surfaces as a result of the step of axially repositioning of the first of the two surface with respect to the second of the two surfaces and/or a step of changing a curvature of at least one of the first and second of the two surfaces. The step of actually repositioning may include increasing a vectored force applied by one of the two surfaces to said another of the two surfaces along the optical axis to make the second surface area bigger than the first surface area and/or flattening a surface of an apex of at least one of the first and second of the two surfaces to define the second contact area as having a flat surface. The method may further include defining the first contact area by forming a contact between apexes of the first and second of the two surfaces, an apex of the first of the two surfaces being an apex of a prolate aspheric surface. In a specific case, when the macro lens includes a third lens that is disposed co-axially with the first and second lenses and separated from the first and second lenses by a gap, the method additionally includes a step of transmitting the incident light through a surface of such third lens and flattening a portion of this surface, which portion is symmetric with respect to the optical axis.

A skilled artisan also readily understands that, according to an idea of a macro lens of the invention, one, two or more individual applantating lens elements are co-axially positioned in an independently actuated piston/cylinder housing arrangement dimensioned to stabilize and maintain the positions of these multiple lens elements and constructed to apply an even pressure to the staged applanating surfaces such as to vary a diameter of an applanated are in each of the applanated surfaces. The amount of pressure applied to the applanating macro lens system is defined in response to the desired output (such as focal length and/or mitigation of macro lens aberrations). The piston cylinder housing is constructed of an optically clear material through the lens aperture and a light absorbing surface along the "barrel" of the housing (for example, dark paint). The construction may include materials such as rigid glass or acrylic (such as PMMA). The applanating lenses were described previously as a mechanically soft material of aspherical surfaces to create a staged applanation. Both the asphericity of the surface of the lens being applanated and concentric, staged in response to the changed pressure minimize the aberrations of deformation and facilitate optical quality of an image formed with the macro lens. The piston pressure is applied in an even manner around the flange ring of the piston (that is, to the peripheral portion of the macro lens or its component). Depending upon the size of the constituent lenses and stiffness of the applanating lens material, the actuating pressure force may be applied by piezo electric crystal, hydraulic pressure system, servo motor, or mechanical threading mechanism. Each applanating lens assembly may be positive or negative, and embedded in (surrounded by) ambient medium including fluid with a refractive index that is either higher or lower than a refractive index of the material from which the applanating lens is fabricated. In other words, the optical power of a given applanating lens may increase or decrease (i.e., become more positive or more negative as compared with that in the unstressed state) in response to the pressure applied to the lens by an external element such as piston.

The independently actuated lens assemblies can be placed in a series of two or more non-translating lenses to create a magnifying system and sensor/eye focusing system. The series of lenses is formed, in one case, as an afocal system in which the groups of lenses in the series have a common focal point. Such series of lenses can be dimensioned to focus light transmitted through the series on a sensor placed at a desired fixed location with respect to the rear-most lens element of the macro lens. Both the first and second (or more) constituent lens elements of the macro lens, as well as the detector or sensor, operate in a stationary, fixed position to produce a coordinated output such as magnification, focus, and aberration mitigation.

The invention as recited in claims appended to this disclosure is intended to be assessed in light of the disclosure as a whole. Disclosed aspects, or portions of these aspects, may be combined in ways not listed above. Accordingly, the invention should not be viewed as being limited to the disclosed embodiment(s).

The invention claimed is:

1. A variable-focal-length macro lens system having an optical axis and comprising
   a first lens having a first optical power,
     a second lens having a second optical power and disposed coaxially with the first lens,
     a first repositionable element operably cooperated with at least one of said first and second lenses, and configured
       to define a vectored force, applied to a surface of at least one of the first and second lenses along the optical axis, based on a reversible motion of the first repositionable element,
       to define a flat area of at least one of a first surface of the first lens and a second surface of the second lens in response to said reversible motion, said first and second surfaces facing each other, said first and second surfaces being in contact with one another at an area centered at the optical axis when the first and second lenses are not stressed by said first repositionable element, said flat area being symmetric about the optical axis,
     and
       to reversibly change a measure of applanation of the at least one of a first surface of the first lens and a second surface of the second lens in response to the reversible motion, a surface area of said flat area being dependent on a magnitude of said reversible motion,
   wherein a focal length of said macro lens system is dependent on said reversible motion.

2. A system according to claim 1, wherein said vectored force is applied to a peripheral portion of said surface of at least one of the first and second lenses.

3. A system according to claim 1, further comprising a housing unit defining an outer shell and a hollow therein, said first and second lenses being disposed in said hollow, a portion of said first repositionable element dimensioned to reversibly move inside the hollow along the optical axis.

4. A system according to claim 3, wherein said first repositionable element includes a piston.

5. A system according to claim 3, wherein a surface of said hollow carries a thread dimensioned to guide said first repositionable element.

6. A system according to claim 1, wherein said at least one of said first and second surfaces includes, in an unstressed state, a prolate aspheric surface centered on the optical axis.

7. A system according to claim 1, configured to have the first and second surfaces to interact with one another, in response to a non-zero force applied to a peripheral area of at least one of the first and second surfaces as a result of said reversible motion, to mutually flatten one another to define respective flattened areas centered on the optical axis, diameters of each of said flattened areas progressively increasing with an increase of said non-zero force.

8. A system according to claim 1, further comprising a third lens disposed coaxially with the first and second lenses and separated from the first lens by the second lens, the third lens having a prolate aspheric surface centered on the optical axis.

9. A system according to claim 8, including two groups of lenses, the first and second groups separated from each other by a gap, the first group including the first and second lenses, the second group including the third lens, and further comprising:
   a second repositionable element in operable cooperation with the second group and configured to change a curvature of a surface of the third lens in response to a reversible motion of said second repositionable element.

10. A system according to claim 9, wherein a focal point of the first group of lenses and a focal point of the second group of lenses coincide.

11. A system according to claim 9, wherein the first group of lenses has a positive optical power and the second group of lenses has a negative optical power.

12. A system according to claim 9, wherein each of the first and second groups of lenses has a corresponding positive optical power.

13. A system according to claim 12, wherein the second group of lenses is submerged in a fluid, a refractive index of which is higher than a refractive index of the third lens.

14. An optical camera comprising a macro lens system according to claim 9 and an optical detector in optical communication with the first group of lenses and separated from the first group of lenses by the second group of lenses.

15. A variable-focal-length macro lens system having an optical axis and comprising
   a first lens having a first optical power,
   a second lens having a second optical power and disposed coaxially with the first lens,
   a first repositionable element operably cooperated with at least one of said first and second lenses, and configured
     to reversibly change a measure of applanation of at least one of a first surface of the first lens and a second surface of the second lens in response to a reversible motion of said first repositionable element, said first and second surfaces facing each other, a focal length of said macro lens system being dependent on said reversible motion of the first repositionable element, wherein the macro lens system is configured to have the first and second surfaces to interact with one another, in response to a non-zero force applied to a peripheral area of at least one of the first and second surfaces as a result of said reversible motion, to mutually flatten one another to define respective flattened areas centered on the optical axis, diameters of each of said flattened areas progressively increasing with an increase of said non-zero force.

16. A system according to claim 15, wherein said first and second surfaces are in contact with one another at an area centered at the optical axis when the first and second lenses are not stressed by said first repositionable element.

17. A system according to claim 16, further comprising a third lens disposed coaxially with the first and second lenses and separated from the first lens by the second lens, the third lens having a prolate aspheric surface centered on the optical axis.

18. A system according to claim 16, including two groups of lenses, the first and second groups separated from each other by a gap, the first group including the first and second lenses, the second group including a third lens, and further comprising:

a second repositionable element in operable cooperation with the second group and configured to change a curvature of a surface of the third lens in response to a reversible motion of said second repositionable element.

19. A system according to claim 18, wherein a focal point of the first group of lenses and a focal point of the second group of lenses coincide.

20. A system according to claim 18, wherein the first group of lenses has a positive optical power and the second group of lenses has a negative optical power.

21. A system according to claim 18, wherein each of the first and second groups of lenses has a corresponding positive optical power.

22. A system according to claim 21, wherein the second group of lenses is submerged in a fluid, a refractive index of which is higher than a refractive index of the third lens.

23. A system comprising a macro lens system according to claim 15, and an optical detector in optical communication with the first group of lenses and separated from the first group of lenses by the second group of lenses.

24. A variable-focal-length macro lens system having an optical axis and comprising:

a first lens having a first optical power, a second lens having a second optical power and disposed coaxially with the first lens, a third lens disposed coaxially with the first and second lenses and separated from the first lens by the second lens, the third lens having a prolate aspheric surface centered on the optical axis, wherein the system includes two groups of lenses, the first and second groups separated from each other by a gap, the first group including the first and second lenses, the second group including the third lens, a first repositionable element operably cooperated with at least one of said first and second lenses, and configured to reversibly change a measure of applanation of at least one of a first surface of the first lens and a second surface of the second lens in response to a reversible motion of said first repositionable element, said first and second surfaces facing each other, a focal length of said macro lens system being dependent on said reversible motion of the first repositionable element, wherein said first and second surfaces are in contact with one another at an area centered at the optical axis when the first and second lenses are not stressed by said first repositionable element, and a second repositionable element in operable cooperation with the second group and configured to change a curvature of a surface of the third lens in response to a reversible motion of said second repositionable element.

25. A system according to claim 24, wherein a focal point of the first group of lenses and a focal point of the second group of lenses coincide.

26. A system according to claim 24, wherein the first group of lenses has a positive optical power and the second group of lenses has a negative optical power.

27. A system according to claim 24, wherein each of the first and second groups of lenses has a corresponding positive optical power.

28. A system according to claim 27, wherein the second group of lenses is submerged in fluid, a refractive index of which is higher than a refractive index of the third lens.

29. An optical camera comprising a macro lens system according to claim 24 and an optical detector in optical communication with the first group of lenses and separated from the first group of lenses by the second group of lenses.

* * * * *